United States Patent
Tandai et al.

(10) Patent No.: US 7,194,055 B2
(45) Date of Patent: Mar. 20, 2007

(54) FRAME SYNCHRONIZATION DEVICE, COMMUNICATION TERMINAL APPARATUS USING THIS DEVICE AND FRAME SYNCHRONIZATION METHOD

(75) Inventors: Tomoya Tandai, Yokohama (JP); Kazumi Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 771 days.

(21) Appl. No.: 10/359,692

(22) Filed: Feb. 7, 2003

(65) Prior Publication Data

US 2003/0171128 A1   Sep. 11, 2003

(30) Foreign Application Priority Data

Feb. 8, 2002   (JP) ............... 2002-031910
Feb. 4, 2003   (JP) ............... 2003-027437

(51) Int. Cl.
    *H04L 7/00*   (2006.01)
(52) U.S. Cl. ............. 375/368; 375/145; 375/343
(58) Field of Classification Search ........ 375/143,
    375/149–153, 354–356, 360, 362, 364–366,
    375/368–370, 343; 370/203, 206, 208, 210,
    370/343, 441–442, 480, 482, 484, 503–504,
    370/507, 510, 512, 518
    See application file for complete search history.

(56) References Cited

U.S. PATENT DOCUMENTS

| | | | |
|---|---|---|---|
| 5,594,754 A * | 1/1997 | Dohi et al. | 375/148 |
| 5,596,582 A * | 1/1997 | Sato et al. | 370/509 |
| 6,169,751 B1 * | 1/2001 | Shirakata et al. | 370/480 |
| 6,192,056 B1 * | 2/2001 | Tsuruoka | 370/504 |
| 6,246,735 B1 * | 6/2001 | Sano et al. | 375/364 |
| 6,275,552 B1 * | 8/2001 | Ando | 375/368 |
| 6,993,083 B1 * | 1/2006 | Shirakata et al. | 375/260 |
| 7,006,587 B1 * | 2/2006 | Lewis et al. | 375/365 |
| 7,027,541 B2 * | 4/2006 | Suzuki | 375/354 |
| 2002/0122382 A1 * | 9/2002 | Ma et al. | 370/208 |
| 2004/0223622 A1 * | 11/2004 | Lindemann et al. | 381/79 |

FOREIGN PATENT DOCUMENTS

| | | |
|---|---|---|
| JP | 2000-349733 | 12/2000 |
| JP | 2002-118542 | 4/2002 |

\* cited by examiner

*Primary Examiner*—Kevin Burd
*Assistant Examiner*—Freshteh N Aghdam
(74) *Attorney, Agent, or Firm*—Oblon, Spivak, McClelland, Maier & Neustadt, P.C.

(57) ABSTRACT

According to the present invention, there is disclosed a frame synchronization device which detects a time point to start a data frame from a received signal. Here, the received signal is constituted by disposing the data frame following a preamble period constituted by repeatedly disposing a synchronization symbol. The device stores the synchronization symbol in a memory, and establishes correlation between the synchronization symbol stored in the memory and the received signal by the first correlation processor. The received signal is delayed by a time corresponding to a length of the synchronization symbol by a delay unit, correlation is established between signals before and after the delay by a second correlation processor, and the preamble period is detected from a correlation processing result. The start time point of the data frame is detected based on the correlation processing result of the first correlation processor obtained during the preamble period.

15 Claims, 21 Drawing Sheets

Received signal intensity

Received signal differential intensity level signal

Received signal level signal

Frame edge detection signal

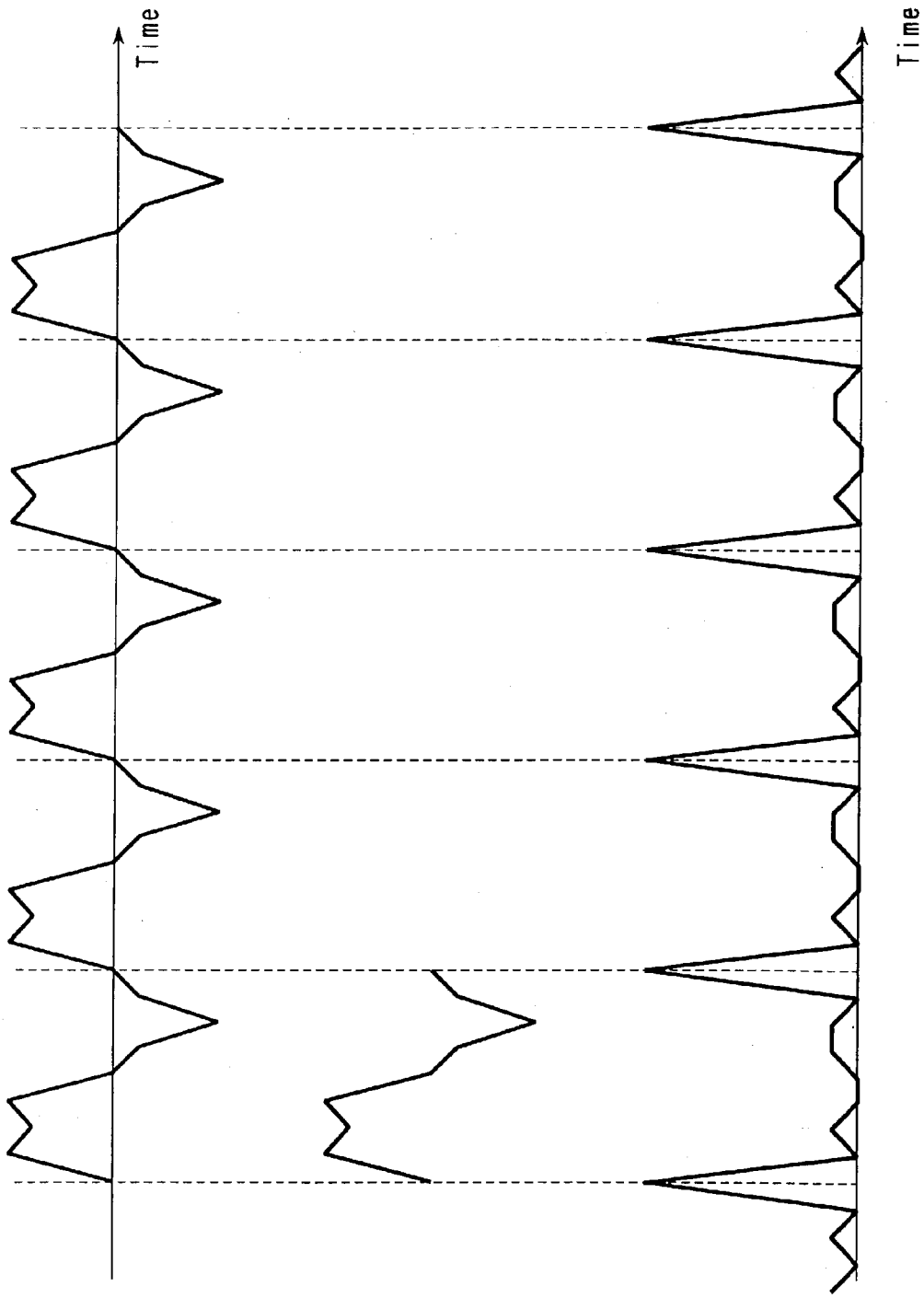

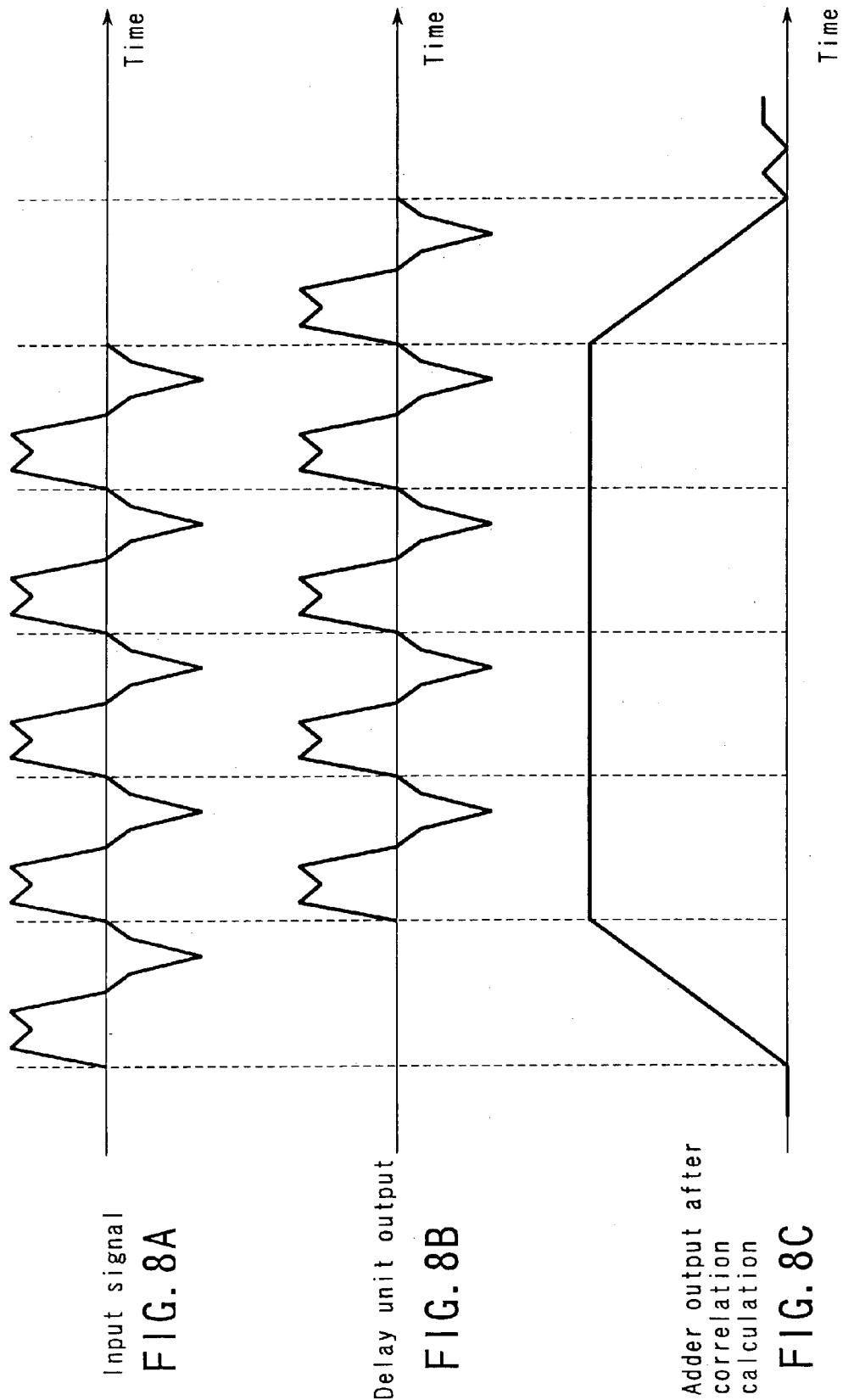

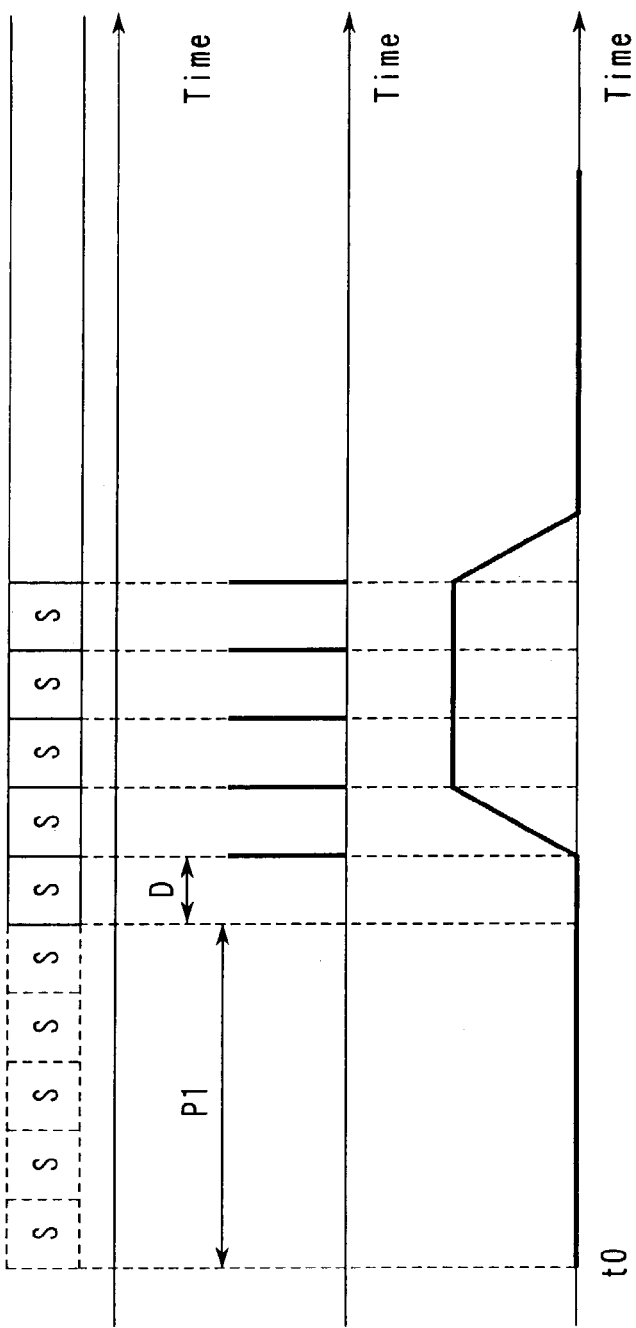

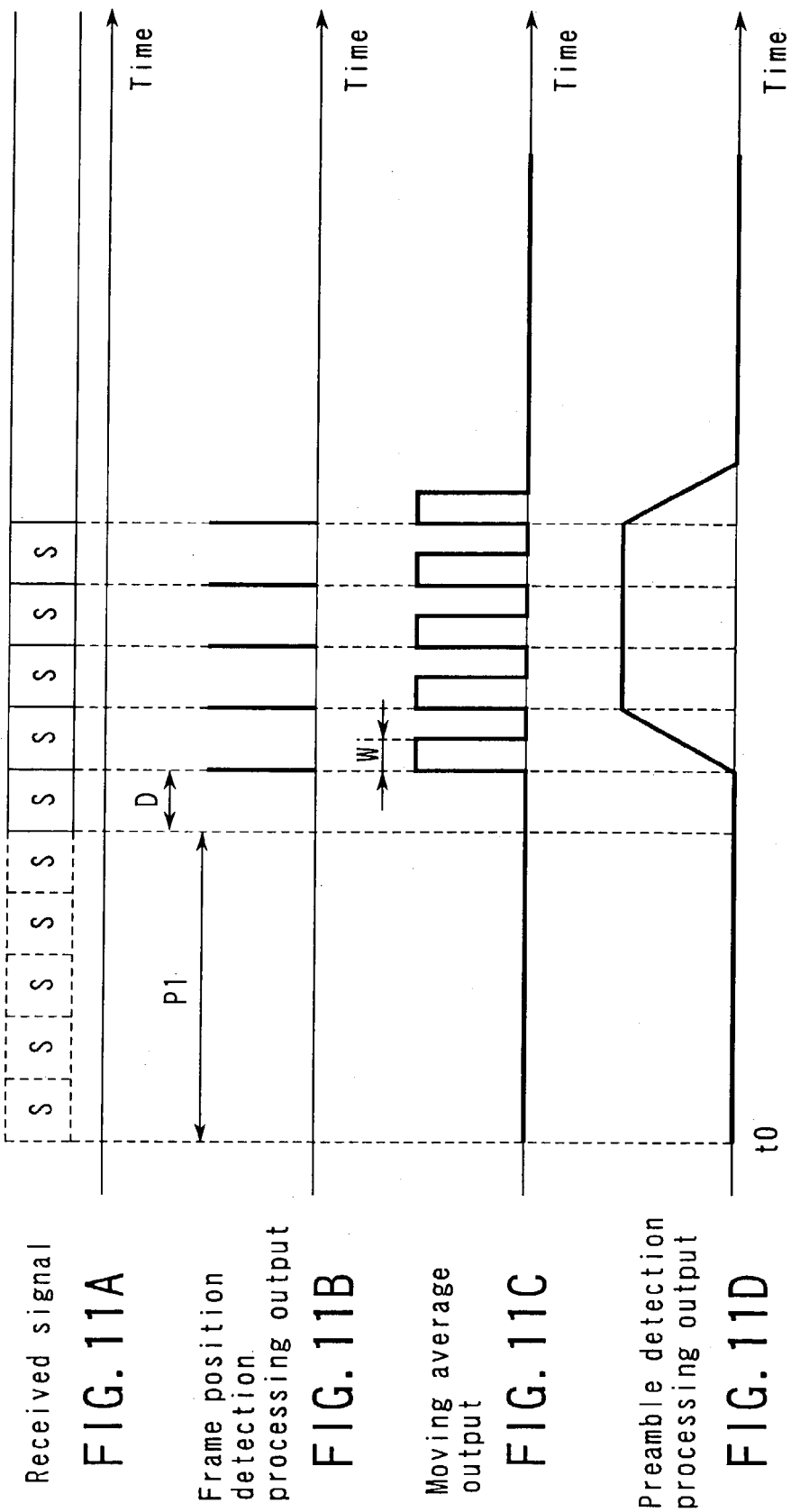

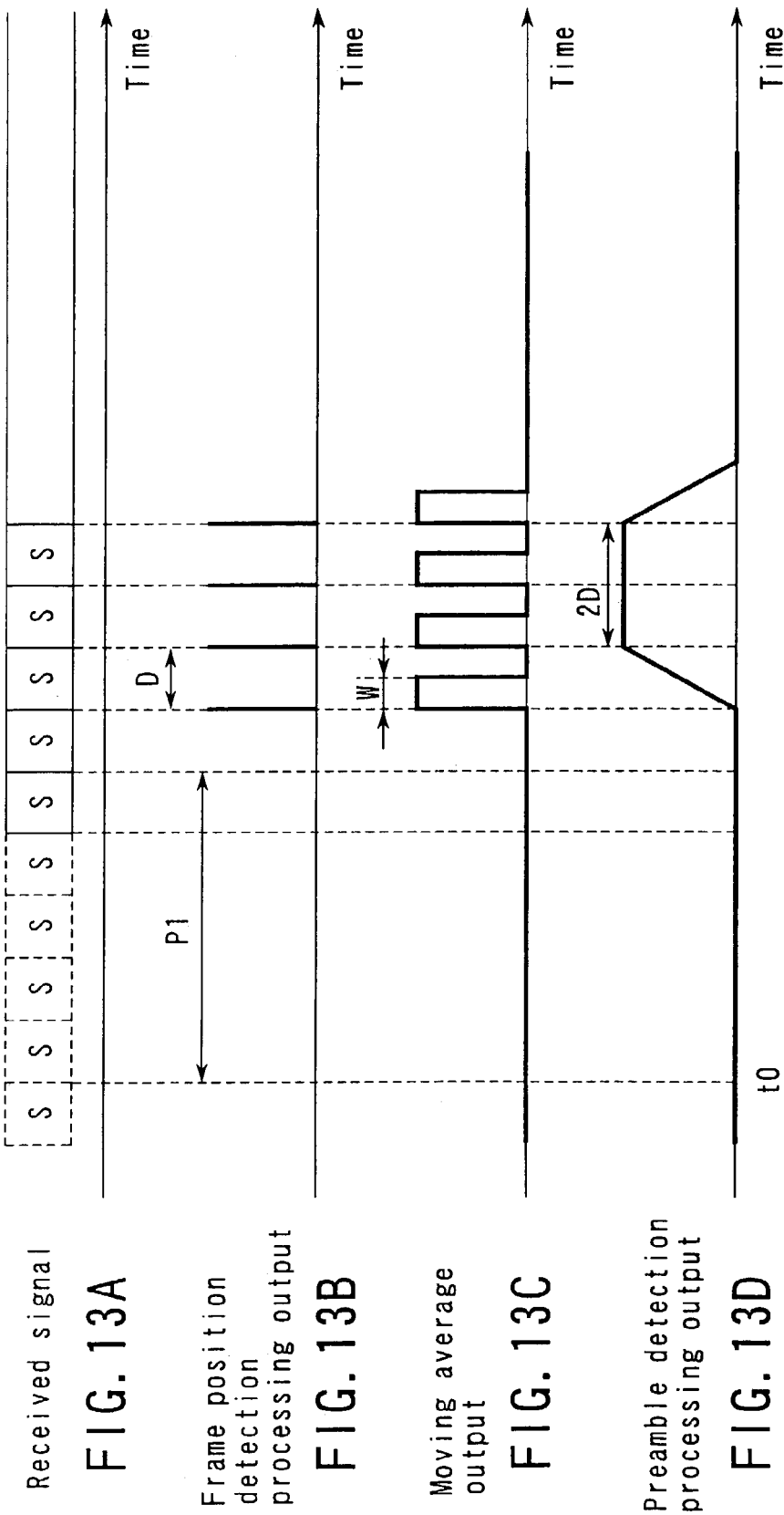

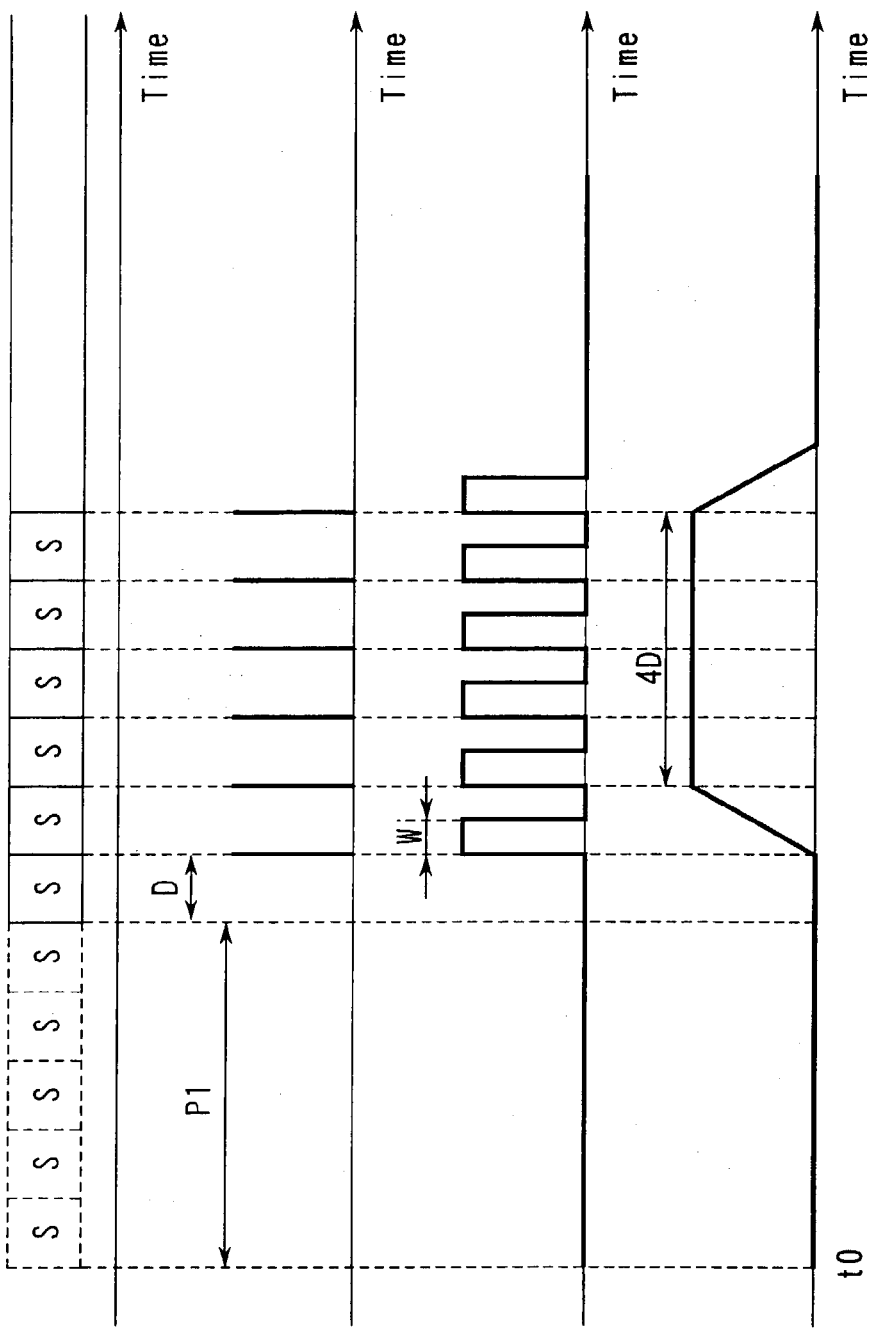

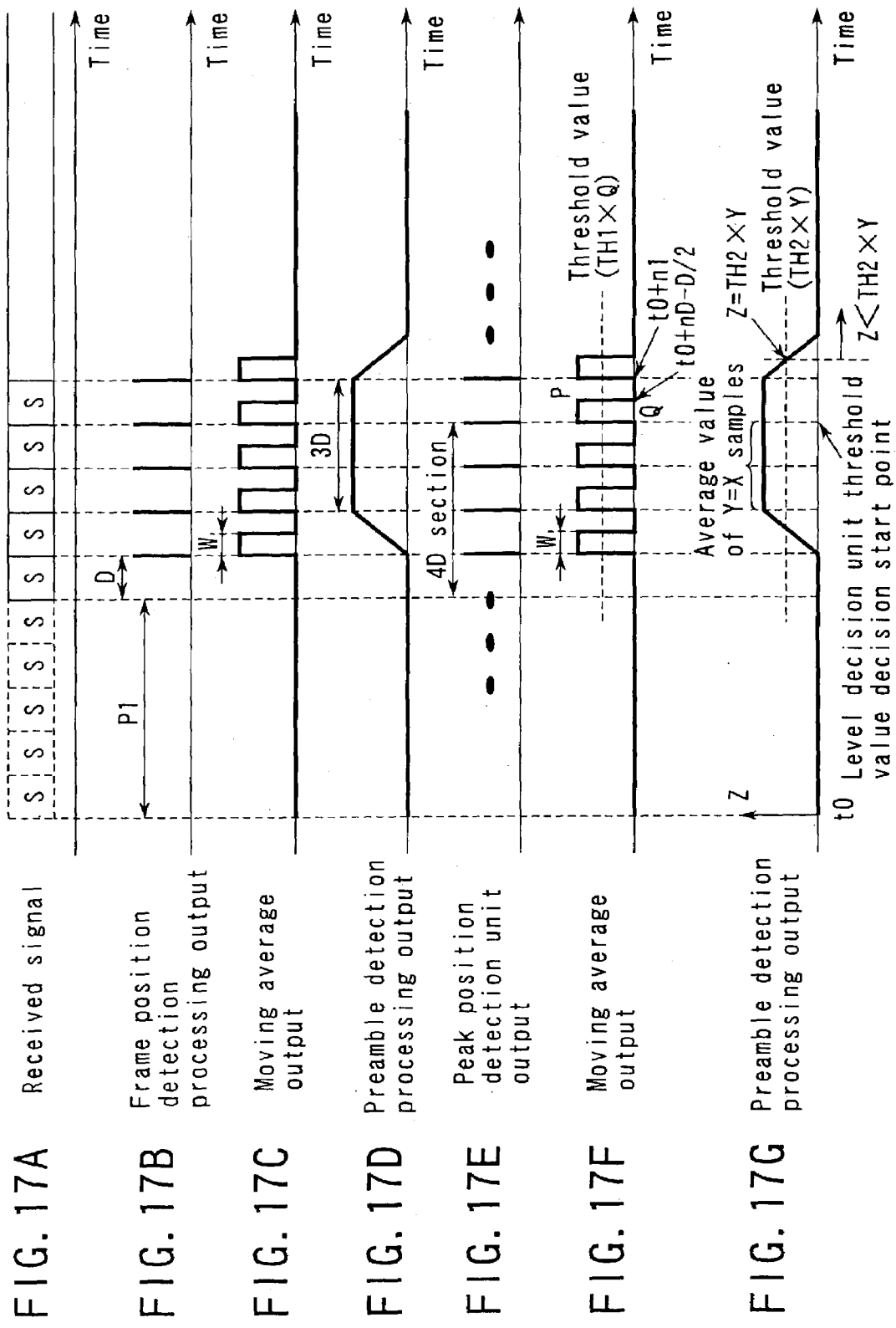

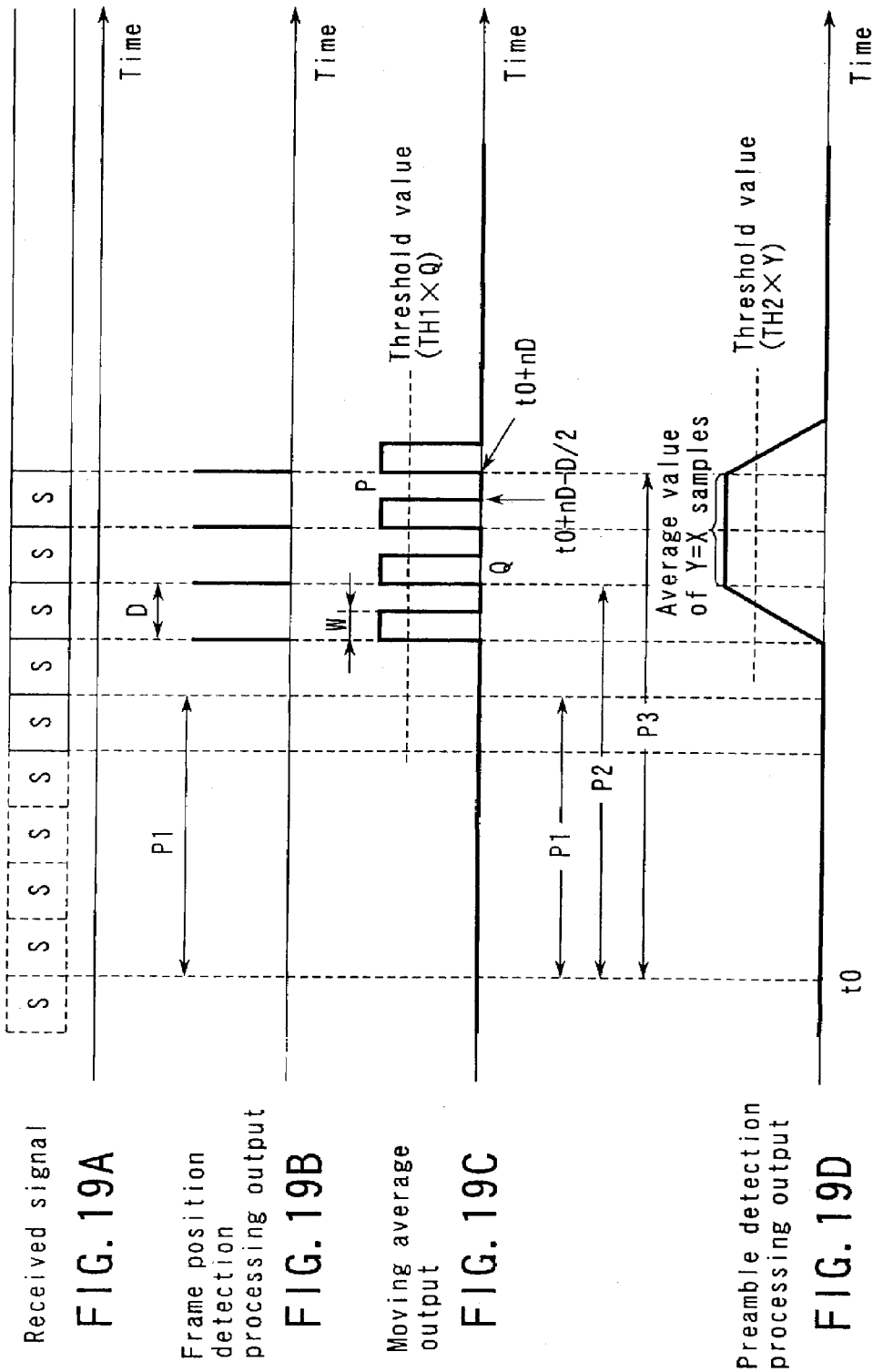

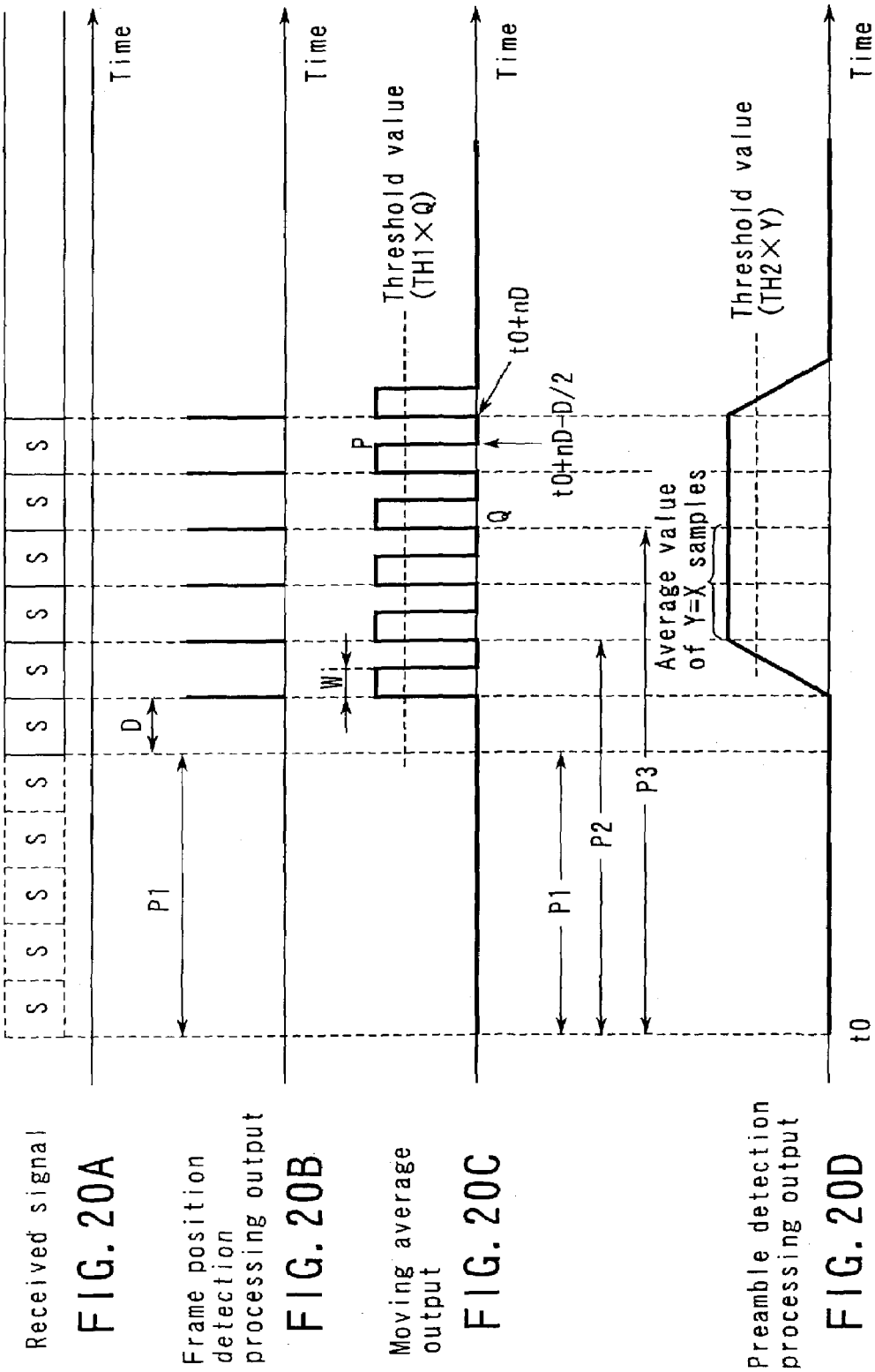

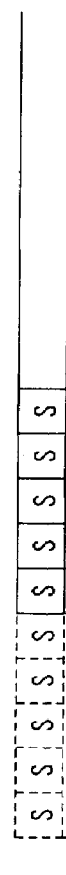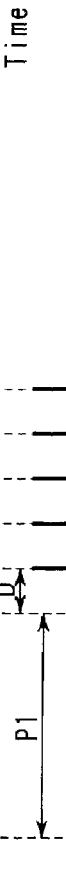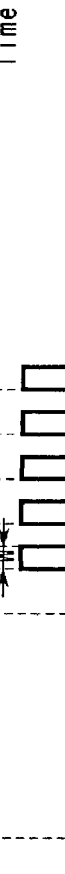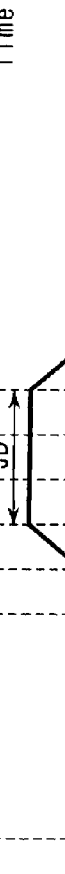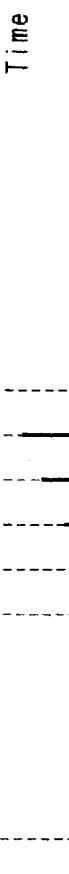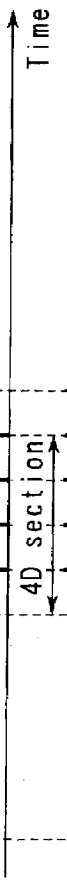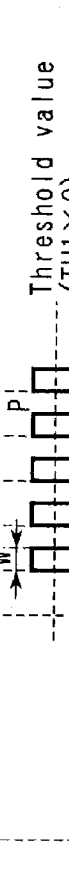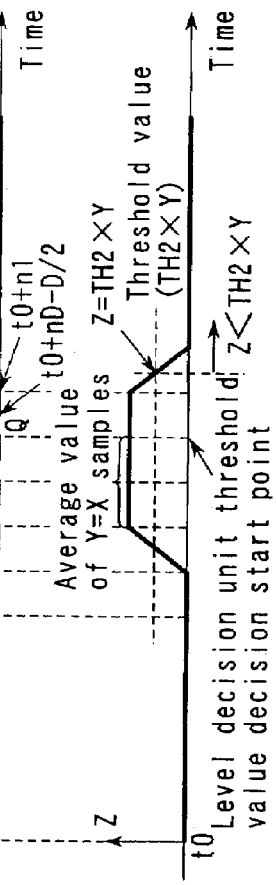
FIG. 23A Received signal
FIG. 23B Frame position detection processing output
FIG. 23C Moving average output
FIG. 23D Preamble detection processing output
FIG. 23E Accumulation addition output
FIG. 23F Peak position detection unit output
FIG. 23G Moving average output
FIG. 23H Preamble detection processing output

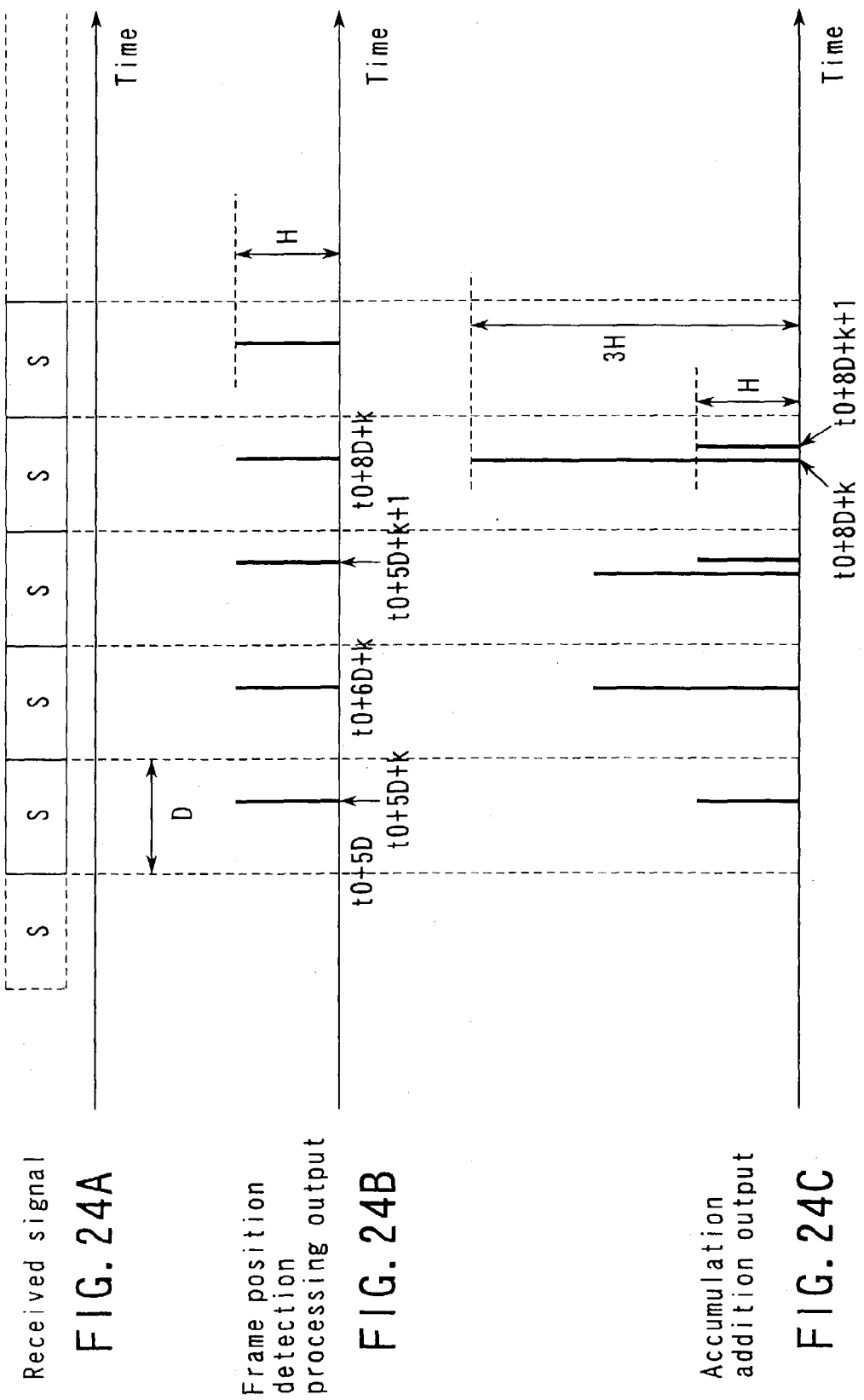

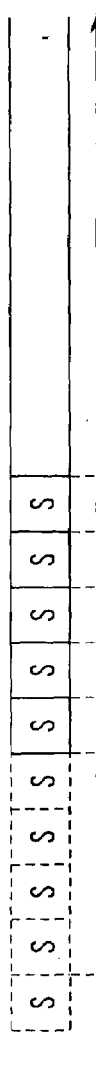
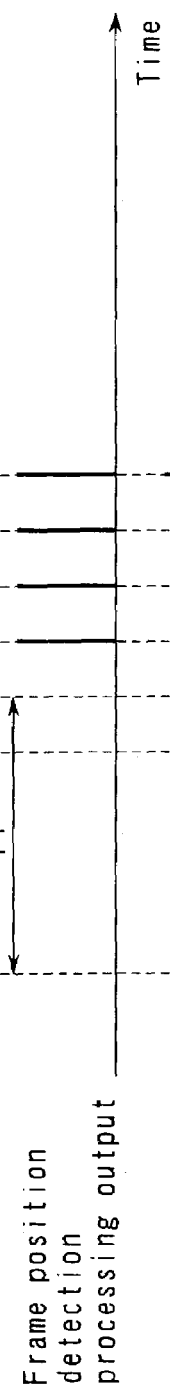
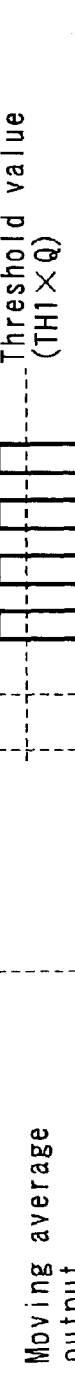
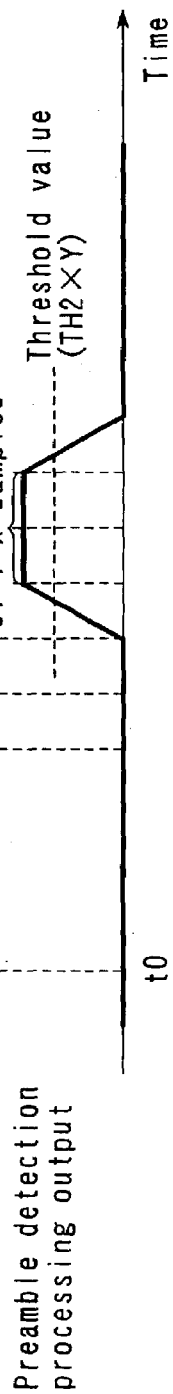
FIG. 26A Received signal
FIG. 26B Frame position detection processing output
FIG. 26C Accumulation addition output
FIG. 26D Moving average output
FIG. 26E Preamble detection processing output

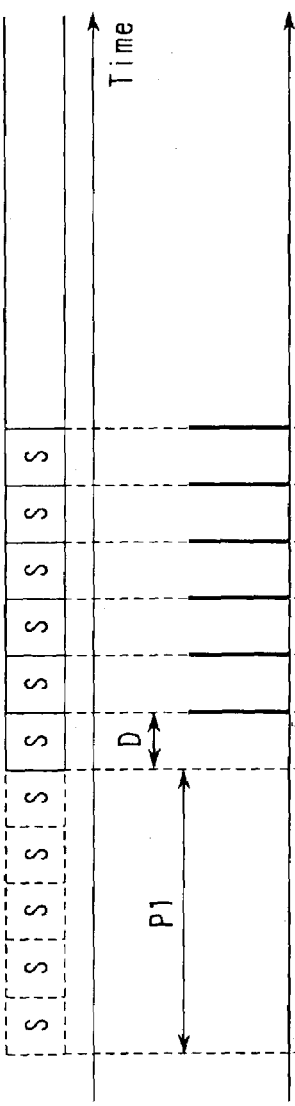
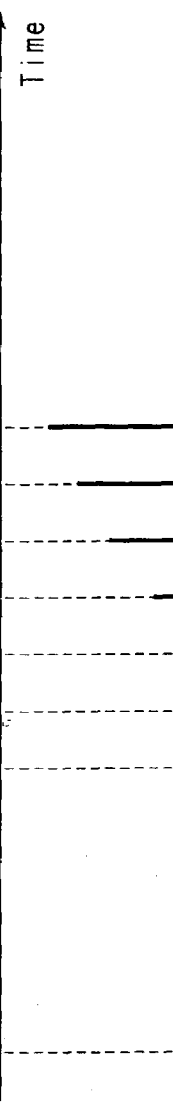
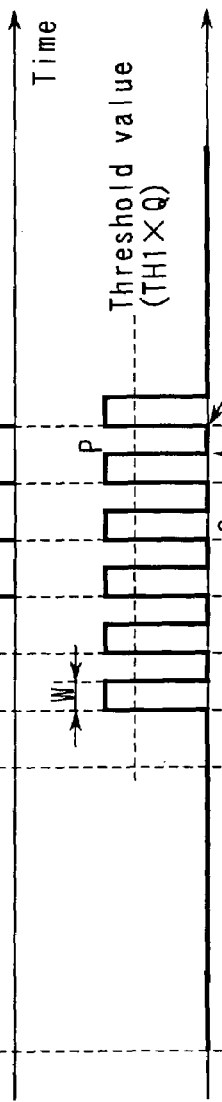
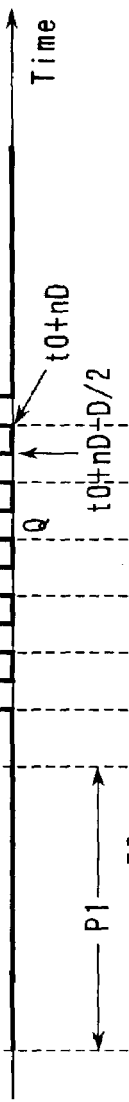
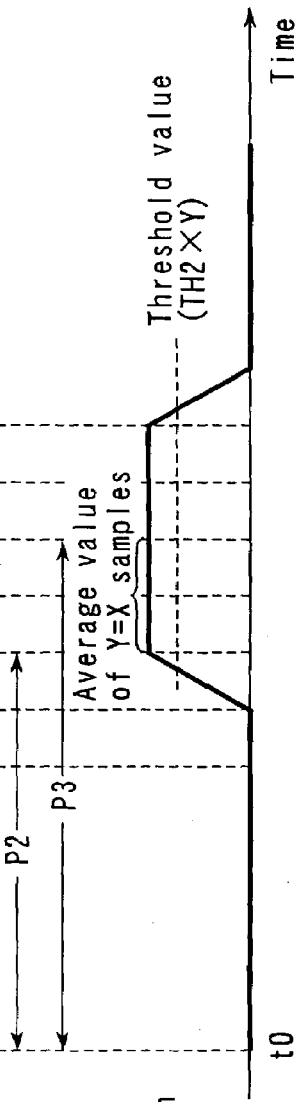
FIG. 27A  Received signal
FIG. 27B  Frame position detection processing output
FIG. 27C  Accumulation addition output
FIG. 27D  Moving average output
FIG. 27E  Preamble detection processing output

FRAME SYNCHRONIZATION DEVICE, COMMUNICATION TERMINAL APPARATUS USING THIS DEVICE AND FRAME SYNCHRONIZATION METHOD

CROSS-REFERENCE TO RELATED APPLICATIONS

This application is based upon and claims the benefit of priority from the prior Japanese Patent Applications No. 2002-031910, filed Feb. 8, 2002; and No. 2003-027437, filed Feb. 4, 2003, the entire contents of both of which are incorporated herein by reference.

BACKGROUND OF THE INVENTION

1. Field of the Invention

The present invention relates to a frame synchronization device which uses a symbol for synchronization in which a known data series is repeatedly arranged to perform synchronization processing of a received frame, a communication terminal apparatus in which the device is used and a frame synchronization method.

2. Description of the Related Art

To perform communication, mutual synchronization needs to be secured between transmission and reception sides. A method for establishing the synchronization differs with a method or protocol of communication. Here, an orthogonal frequency division multiplexing (OFDM) method will be described.

In the OFDM method, the symbol for synchronization in which arrangement of a known data series is repeated a plurality of times is used to establish the synchronization of a frame among communication apparatuses. This symbol for synchronization is disposed immediately before a data frame, and generally called a preamble. A reception apparatus of the OFDM method in which this preamble is used to establish the synchronization is disclosed, for example, in Jpn. Pat. Appln. KOKAI Publication No. 2000-349733.

In the frame synchronization device of the reception apparatus disclosed in this document, first a rising edge is detected from a received signal to find the top of a section of the symbol for synchronization (preamble). This section of the symbol for synchronization is divided for each known data series. A correlated value of each divided data series with the known data series held beforehand is calculated. The calculated correlated values for the symbols for synchronization are added, and timing when the added result indicates a peak value is detected. This timing is assumed as a synchronization timing that indicates the top of the data frame, and a processing section of fast Fourier Transform (FFT) is set based on the synchronization timing.

The above-described frame synchronization device has the following problems.

First, when noises are mixed, the peak value after addition is sometimes generated at an unexpected timing. Moreover, when an influence of fluctuation of reception intensity is exerted, a rising edge is not normally detected. The number of symbols of the preamble that can be used in frame synchronization sometimes fluctuates. In this manner, detection precision of the synchronization timing is sometimes deteriorated and incorrect synchronization occurs in accordance with a reception situation.

An object of the present invention is to provide a frame synchronization device which can correctly establish frame synchronization, a communication terminal apparatus which uses the device and a frame synchronization method.

BRIEF SUMMARY OF THE INVENTION

According to an aspect of the present invention, there is provided a frame synchronization device, which receives a received signal that includes a preamble of repeating synchronization symbols, and a data frame following the preamble, the frame synchronization device comprising:

a first correlation unit configured to repeatedly generate a synchronization symbol, and correlate between the generated synchronization symbols and the received signal to form a first correlation signal, a second correlation unit configured to delay the received signal by a time corresponding to a length of the synchronization symbols to form a delay signal, and correlate between the delay signal and the received signal to form a second correlation signal, a preamble detector configured to detect a preamble period based on the second correlation signal, and to output a period specifying signal, and a generator configured to detect a start time point of the data frame based on the period specifying signal and the first correlation signal, and to generate a frame synchronize signal at substantially the same time of the detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 6A to 6C are timing charts showing the processing content of the frame position detection unit shown in FIG. 2;

FIGS. 8A to 8C are timing charts showing the processing content of the preamble detection unit shown in FIG. 2;

FIGS. 9A to 9C are timing charts showing the processing content of the frame synchronization device in the first embodiment;

FIGS. 11A to 11D are timing charts showing the processing content of the frame synchronization device in the second embodiment;

FIGS. 13A to 13D are timing charts showing the processing content for four symbols of the preamble in the frame synchronization device in the second embodiment;

FIGS. 14A to 14D are timing charts showing the processing content for six symbols of the preamble in the frame synchronization device in the second embodiment;

FIGS. 17A to 17G are timing charts showing the processing content of the frame synchronization device in the third embodiment;

FIGS. 19A to 19D are timing charts showing the processing content for four symbols of the preamble in the frame synchronization device in the third embodiment;

FIGS. 20A to 20D are timing charts showing the processing content for six symbols of the preamble in the frame synchronization device in the third embodiment;

FIGS. 23A to 23H are timing charts showing the processing content of the frame synchronization device in the fourth embodiment;

FIGS. 24A to 24C are timing charts showing a method of determining a temporary frame start position of the frame synchronization device in the fourth embodiment;

FIGS. 26A to 26E are timing charts showing the processing content for four symbols of the preamble in the frame synchronization device in the fourth embodiment;

FIGS. 27A to 27E are timing charts showing the processing content for six symbols of the preamble in the frame synchronization device in the fourth embodiment.

DETAILED DESCRIPTION OF THE INVENTION

Embodiments of the present invention will be described hereinafter in detail with reference to the drawings.

Figure 1:
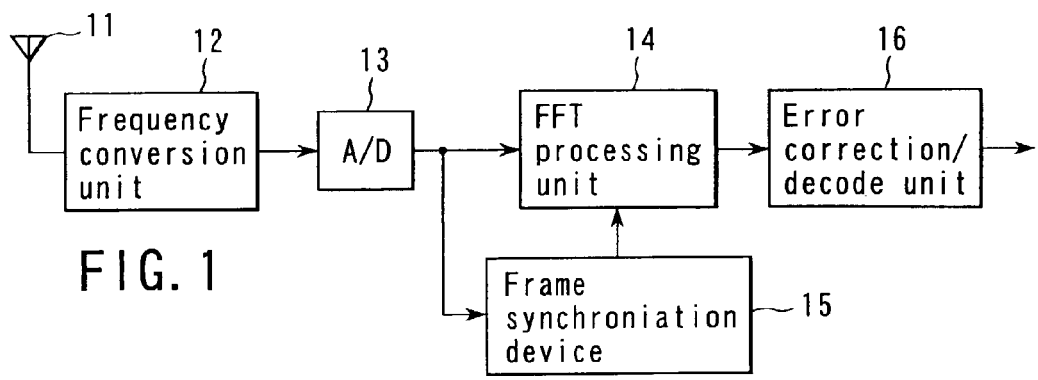
FIG. 1 is a block diagram showing a constitution of a receiver portion of a communication terminal apparatus to which the present invention is applied.

FIG. 1 is a block diagram showing a constitution of a reception system of a communication terminal apparatus by an OFDM method to which the present invention is applied. It should be noted that communication signal (OFDM transmission signal) discussed in the embodiment is the signal transferred in burst mode and is assumed that to which synchronization symbols are inserted, the synchronization symbols repeat a known data series a plurality of times during a preamble period immediately before a data frame. Also, in the following description, the combination of preamble and data frame is called a received frame.

In FIG. 1, an OFDM transmission signal received via an antenna 11 is converted to a base band by a frequency conversion unit 12, digitized by an analog/digital (A/D) converter 13, subsequently supplied to a Fast Fourier Transform (FFT) processing unit 14, and supplied to a frame synchronization device 15 according to the present invention.

The frame synchronization device 15 detects correlation with a known data series constituting a preamble with respect to an input OFDM signal to detect a preamble section, specifies a time point of the top of a data frame from an end time point of the section, and generates a frame synchronous signal at this time. This frame synchronous signal is supplied to the FFT processing unit 14.

The FFT processing unit 14 distinguishes an effective symbol section of the input OFDM signal based on the frame synchronous signal, converts a signal of a time region of this section to a signal of a frequency region, and demodulates symbol data. This symbol data is subjected to an error correction/decode processing by an error correction/decode unit 16, and thereby original communication data can be obtained.

The embodiment of the frame synchronization device for use in the reception system constituted as described above will be described hereinafter.

(First Embodiment)

Figure 2:
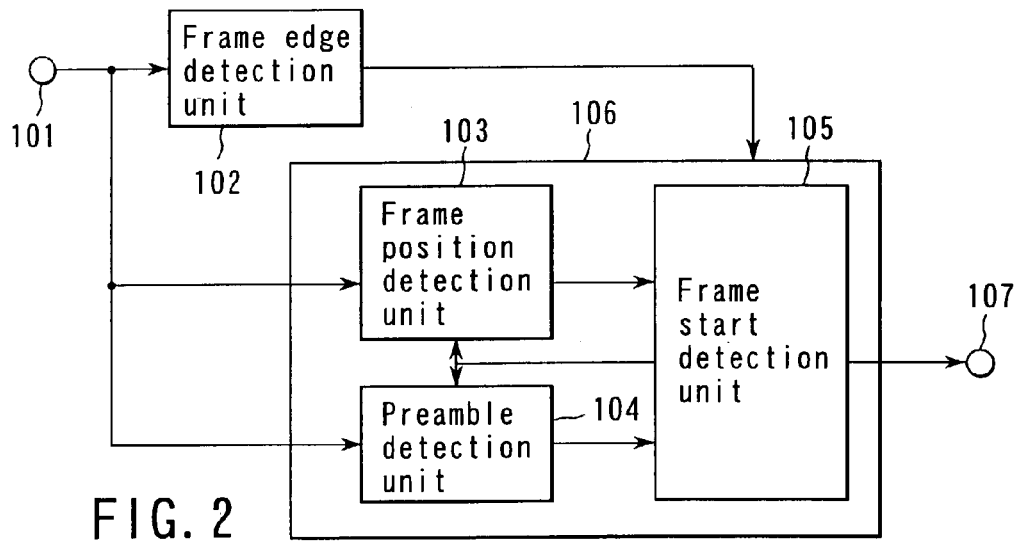
FIG. 2 is a block diagram showing the constitution of a frame synchronization device in a first embodiment of the present invention.

FIG. 2 is a block diagram showing the constitution of the frame synchronization device in a first embodiment. In FIG. 1, a received signal supplied to an input terminal 101 is inputted into a frame edge detection unit 102 and frame start detection processing unit 105. The frame edge detection unit 102 detects a rising edge of a received frame from the input signal, and inputs the signal into the frame start detection processing unit 106. The frame start detection processing unit 106 includes a frame position detection unit 103 which detects a start position of a data frame, a preamble detection unit 104 which detects a preamble sent prior to transmission data, and a frame start detection unit 105 which uses detected results to detect the start position of the data frame. Moreover, the frame start detection unit 105 also has a function of instructing a start of processing with respect to the frame position detection unit 103 and preamble detection unit 104 based on the signal from the frame edge detection unit 102.

An operation of each unit will next be described in detail.

Figure 3:
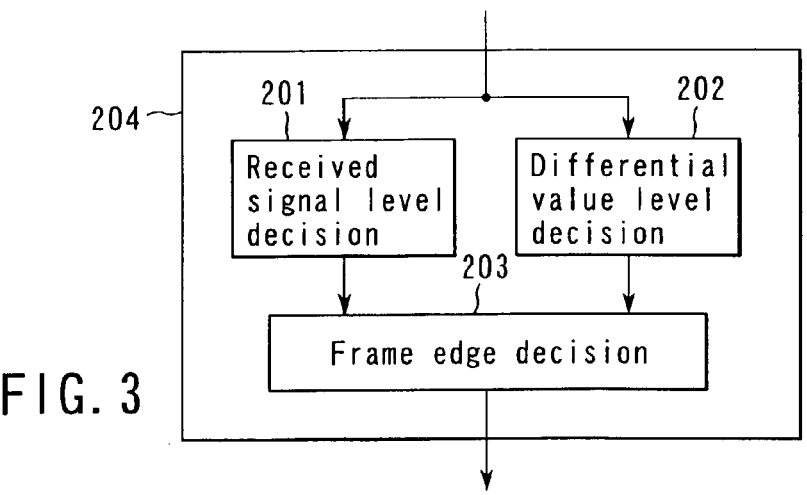
FIG. 3 is a flowchart showing a flow of processing of a frame edge detection unit shown in FIG. 2.

FIG. 3 shows one example of a processing flow of the frame edge detection unit 102 shown in FIG. 2. The frame edge-detection unit 102 includes a received signal level decision step 201 and differential value level decision step 202. The received signal level decision step 201 decides that any signal is detected, when an input level of the given signal exceeds a fixed intensity. Moreover, the differential value level decision step 202 detects a change of the input signal without performing the decision by the level of the input signal. That is, when the input signal is given, rising of the signal intensity is noted regardless of the level to decide the reception of the signal. A frame edge decision step 203 decides a received frame edge based on decided results of the received signal level decision step 201 and differential value level decision step 202.

Figure 4A:
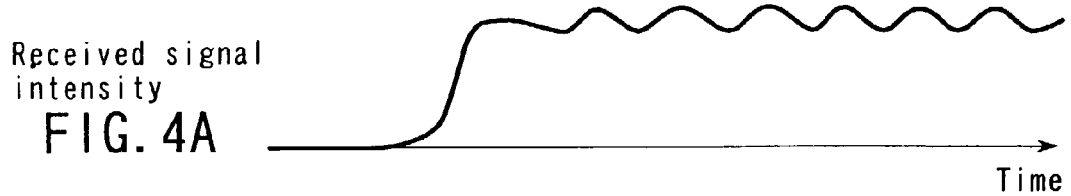
FIGS. 4A to 4D are timing charts showing a processing content of the frame edge detection unit shown in FIG. 2.
Figure 4B:
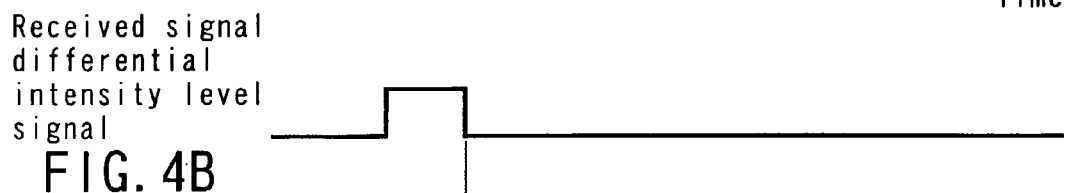

FIGS. 4A to 4D show one example of an input waveform, and an operation of the frame edge detection unit 102. FIG. 4A shows the change of the received signal intensity given to the frame edge detection unit 102 with an elapse of time. The differential value level decision step 202 that has received the signal decides that the signal has arrived by a steep rising portion of the received signal intensity, and outputs an intensity level signal shown in FIG. 4B. In FIG. 4B, the signal is outputted for a rising period of the received signal.

Figure 4C:
Figure 4D:
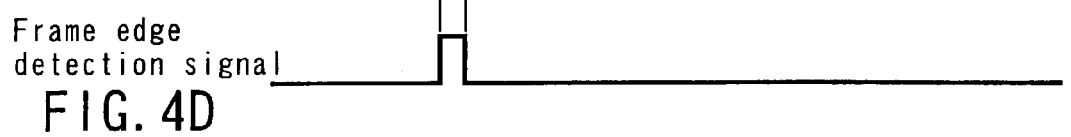

The received signal level decision step 201 decides the arrival of the signal, when the received signal exceeds a certain fixed level. This state is shown in FIG. 4C. When and after the received signal exceeds the certain fixed level, the signal continues to be outputted as long as the signal is given.

Subsequently, the frame edge decision step 203 uses at least one of output results of FIGS. 4B and 4C to decide the received frame edge of the signal.

In this constitution, not only the intensity of the input signal but also the rising of the signal can be used in deciding the received frame edge, and the received frame edge detection with a higher precision is possible.

Figure 5:
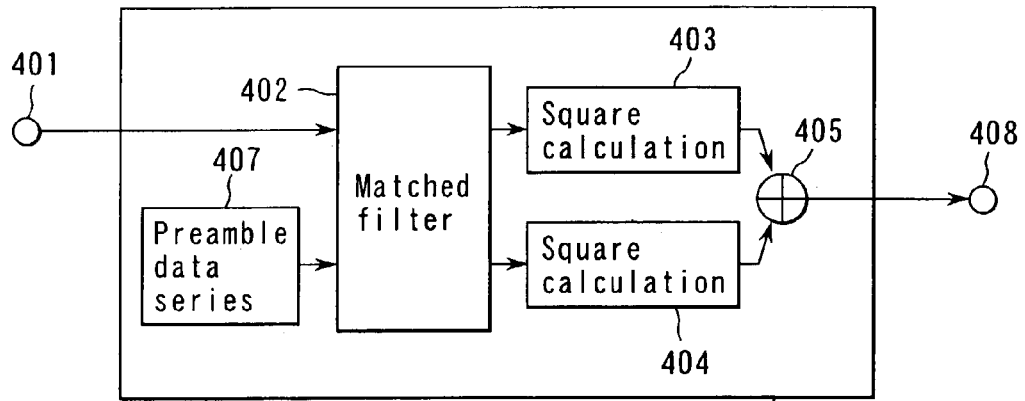
FIG. 5 is a block diagram showing a constitution of a frame position detection unit shown in FIG. 2.

Next the frame position detection unit 103 of FIG. 2 will be described. FIG. 5 is a block diagram showing the constitution of the frame position detection unit 103. A signal given to an input terminal 401 is inputted into a matched filter 402. Separately, a preamble data series outputted from a preamble data series storage unit 407 is inputted into the matched filter 402. The preamble data series is a known signal that is used to secure frame synchronization in communication of OFDM. The matched filter 402 correlates the signal given to the input terminal 401 with the preamble data series. When both the signals are correlated, that is, when the signals are the same, the matched filter 402 decides that there is correlation between the signals, and outputs a correlation detection signal. Since this correlation detection signal includes imaginary and real parts, the respective outputs are subjected to square calculation by square calculators 403 and 404. These are added by an adder 405 and outputted via an output terminal 408.

One example of an output result with respect to the input signal is shown in FIGS. 6A to 6C. FIG. 6A shows an input signal, FIG. 6B shows a known preamble data series, and FIG. 6C shows a correlation processing result. As apparent from these drawings, when the input signal agrees with the preamble data series, the adder 405 outputs the correlation detection signal. Even when the square sum of the correlation detection signals is calculated and thereby a frequency offset is added to the received signal, the data frame position can correctly be detected from the size of the correlation detection signal.

Figure 7:
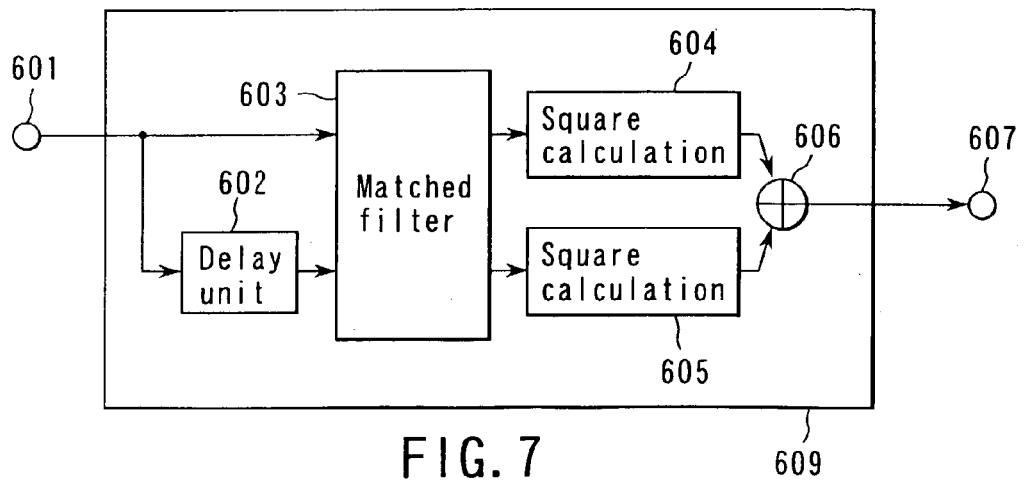
FIG. 7 is a block diagram showing the constitution of a preamble detection unit shown in FIG. 2.

FIG. 7 is a block diagram showing the constitution of the preamble detection unit 104 in FIG. 2. The preamble detection unit 104 includes an input terminal 601, delay unit 602, matched filter 603, square calculators 604 and 605, adder 606, and a output terminal 607. The signal from the input terminal 601 is inputted into the matched filter 603, delayed by the delay unit 602 by a time D corresponding to a sample length of the preamble, and inputted into the same matched filter 603. The matched filter 603 correlates the input signal with a signal obtained by delaying the input signal by the time D. Real and imaginary part components of the correlation detection signal obtained by the correlation are subjected to square calculation by the square calculators 604 and 605, and the adder 606 executes addition processing of both outputs, the additional signal is output from the output terminal 607. The signal obtained in this addition processing indicates that there is a signal input in the matched filter 603 and there is also a signal input before the time D corresponding to the sample length. The matched filter 603 outputs an average value of a sample period for a time having the above-described correlation in accordance with a degree of correlation.

This state is shown in FIGS. 8A to 8C. When the input signal shown in FIG. 8A is given, there is an output of the delay unit 602 as shown in FIG. 8B. This is because the input signal is repeatedly generated in a sample time D, and the delay unit 602 delays the received signal by the sample time D. Therefore, when the matched filter 603 correlates the input signal shown FIG. 8A with the delay signal shown FIG. 8B, a result is obtained as shown in FIG. 8C.

The correlation between the signals before and after the delay by the sample time D is detected, and square sums of the real and imaginary parts are obtained and added. Thereby, even when the frequency offset is added to the received signal, the preamble can correctly be detected from the size of the calculated result. Moreover, while a preamble series continues, the output is kept to be constant, and this can produce an effect that an end time of preamble can easily be found.

Next, one example in which the frame start detection unit 105 of FIG. 2 detects a data frame start position from the received signal will be described. FIGS. 9A to 9C show the outputs of the respective units with respect to the input signal. It is to be noted that an influence of delay time generated by each processing is not considered in the shown signal. In FIGS. 9A to 9C, t0 is a time when the signal arrives, and D indicates a period of the sample length of one symbol of the preamble. As shown in FIG. 9A, it is assumed that ten symbols have arrived as the preamble. Upon receiving the signal, the frame edge detection unit 102 of FIG. 2 detects a received frame edge including the first symbol of the preamble, and outputs the start signal to the frame start detection unit 105. The frame start detection unit 105 which has received the output waits for P1 period corresponding to top five symbols of the preamble, and instructs the frame position detection unit 103 and preamble detection unit 104 to start each processing. The symbol of the preamble obtained in the period P1 is used for adjusting gain of a receiver, and is not used in processing the frame synchronization.

The frame position detection unit 103 that has started the operation after P1 period correlates the input signal with the known preamble series as described above, and outputs a result shown in FIG. 9B. Since five symbols can be used for the frame synchronization, five peaks are shown. Moreover, the input signal is processed with respect to the preamble detection unit 104, and a result shown in FIG. 9C is outputted. Since five symbols can be used for the frame synchronization, as a result a constant value is outputted over a 3D sample period.

The frame start detection unit 105 receives output results of FIGS. 9B and 9C as described above, and detects the frame start position with respect to one symbol in D samples of preamble S, and final symbol of a repeated preamble series. The frame start position obtained in this manner is used as a temporary frame start position of the data frame subsequent to the preamble. Moreover, when the end of the preamble is detected, the start of the data frame can be detected. Based on these, the frame start detection unit 105 determines the final data frame start position, and outputs a frame synchronization establishment signal to an output terminal 107.

The frame start position is detected by the above-described method, and the number of symbols of the preamble fluctuates. Even in this case, the position can uniquely be determined. Moreover, the position is not influenced by the number of symbols of the preamble. Thereby, even in a use environment in which detection precision of the received frame edge is deteriorated, it is possible to correctly detect the data frame start position.

(Second Embodiment)

Figure 10:
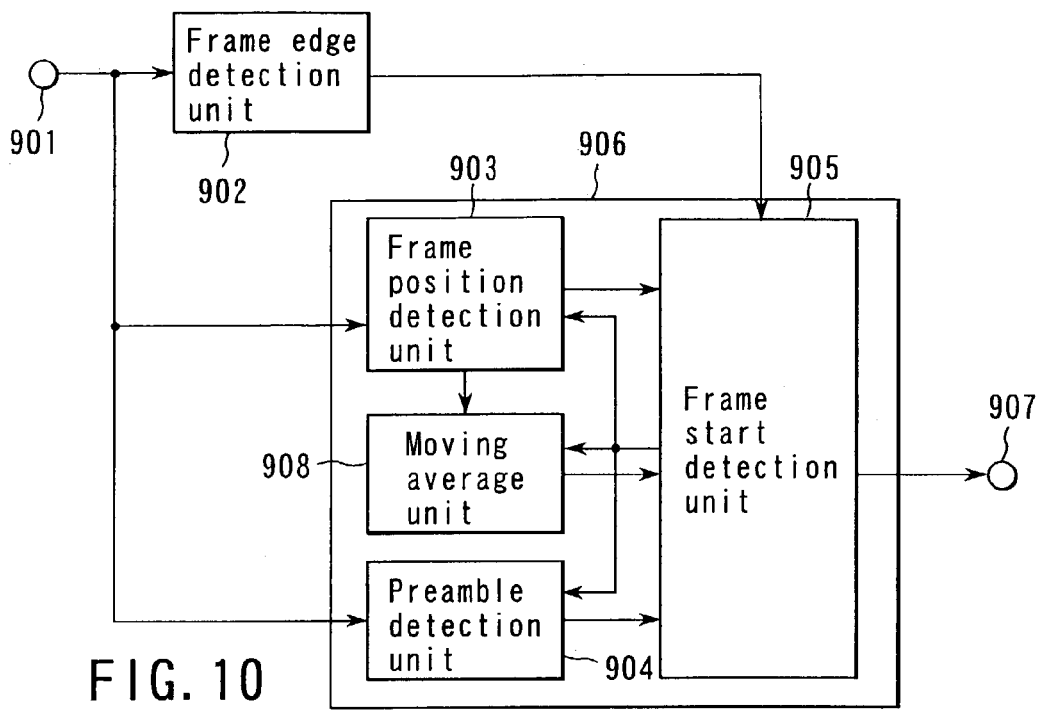
FIG. 10 is a block diagram showing the constitution of the frame synchronization device in a second embodiment of the present invention.

FIG. 10 is a block diagram showing the constitution of the frame synchronization device in a second embodiment of the present invention. In FIG. 10, the received signal given to an input terminal 901 is inputted into a frame edge detection unit 902 and frame start detection processing unit 906. The frame edge detection unit 902 detects the rising edge of a received frame from the input signal, and inputs the detected signal into a frame start detection unit 905. The frame start detection processing unit 906 includes a frame position detection unit 903 which detects the start position of a data frame, a moving average unit 908 which moves/adds detected results, a preamble detection unit 904 which detects a preamble sent prior to the transmission data, and the frame start detection unit 905 which uses these detected results to detect the start position of the received frame. Moreover, the frame start detection unit 905 also has a function of instructing the start of processing with respect to the frame position detection unit 903, preamble detection unit 904, and moving average unit 908 based on the signal from the frame edge detection unit 902.

In the second embodiment, the moving average unit 908 which moves/adds the output of the frame position detection unit 903 is further added to the constitution of FIG. 2 showing the first embodiment.

Next, a state in which the frame start detection unit 905 of FIG. 10 detects the data frame start position from the received signal will be described with reference to FIGS. 11A to 11D. FIGS. 11A to 11D show the outputs of the respective units with respect to the input signal. In the drawings, t0 denotes the time when the received signal arrives, and D indicates a period of the sample length of one symbol of the preamble. As shown in FIG. 11A, it is assumed that ten symbols have arrived as the preamble. Upon receiving the signal, the frame edge detection unit 902 of FIG. 10 detects the received frame edge including the first symbol of the preamble, and outputs the detected signal to the frame start detection unit 905. The frame start detection unit 905 that has received the output waits for P1 period corresponding to the top five symbols of the preamble, and instructs the frame position detection unit 903 and preamble detection unit 904 to start each processing. The symbol of the preamble obtained in the period P1 is used for adjusting the gain of the receiver, and is not used in processing the frame synchronization.

The frame position detection unit 903, which has started the operation after P1 period correlates the input signal with the known preamble series as, described above, and outputs the result shown in FIG. 11B. Since five symbols can be used for the frame synchronization, five peaks are shown. Moreover, the influence of the delay time generated by the processing is not considered in the respective signals shown in FIGS. 11A to 11D.

The signal is also inputted into the moving average unit 908, and subjected to moving average processing. Here, it is assumed that for a moving average sample W less than the sample D, the constant output is obtained. An output result at this time is shown in FIG. 11C. FIG. 11C shows five peaks each having a width corresponding to the sample W.

By this moving average processing, even with use of a radio device under a multi-path environment in which a direct wave and delay wave are multiplexed and arrive with a generated time deviation, a peak position of the processing result is not dispersed and the original peak position can correctly be detected. When the peak position can correctly be detected, it is possible to prevent detecting an erroneous data frame detection point.

Moreover, the input signal is also processed with respect to the preamble detection unit 904, and the result shown in FIG. 11D is outputted. Since five symbols can be used for the frame synchronization, as a result the constant value is outputted over the 3D sample period.

The frame start detection unit 905 receives the output results of FIGS. 11B, 11C, and 11D as described above, and detects the frame start position with respect to one symbol in the sample D of the preamble S, and final symbol of the repeated preamble series. The frame start position obtained in this manner is used as the temporary frame start position of the data frame subsequent to the preamble. Moreover, when the end of the preamble is detected, the start of the data frame can be detected. Based on these, the frame start detection unit 905 determines the final data frame start position, and outputs the frame synchronization establishment signal to an output terminal 907.

Figure 12:
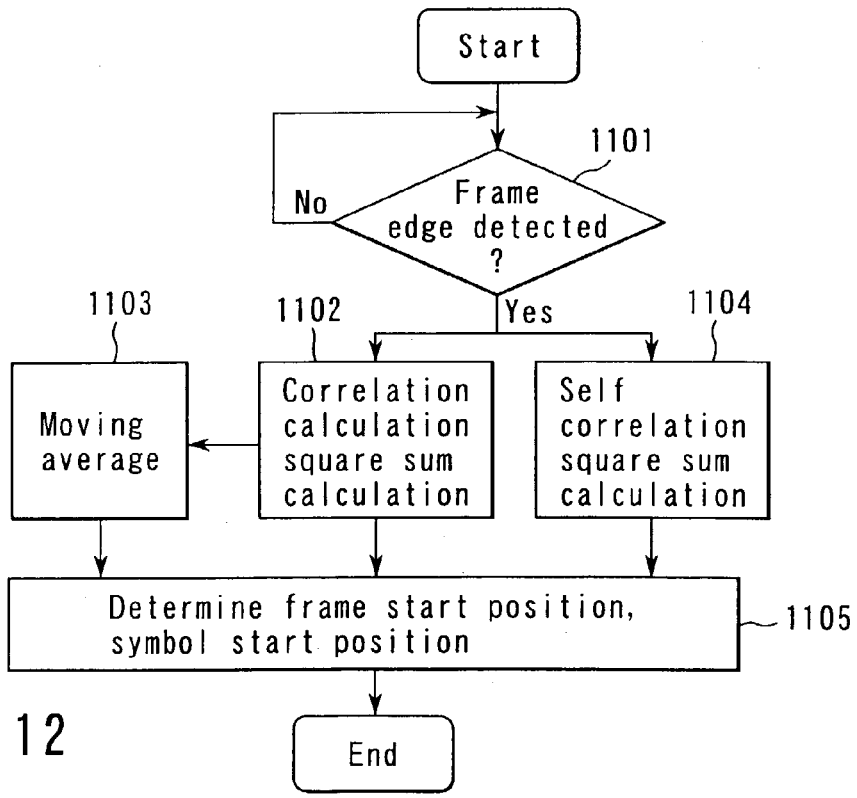
FIG. 12 is a flowchart showing the flow of the processing of the frame synchronization device in the second embodiment.

FIG. 12 is a flowchart showing the flow of the processing of the frame synchronization device in the second embodiment. First the frame edge of the preamble sent prior to received data is detected (step 1101). When the frame edge is detected, correlation calculation and square sum calculation are next performed (step 1102). This processing is performed substantially for detection processing of the frame position. Subsequently, this result is inputted to step 1103, and subjected to the moving average (step 1103) to form a signal that has a peak with a constant time interval. The signal is also inputted into the step 1105. Additionally, a frame edge detection result obtained in the step 1101 is subjected to self correlation square sum calculation (step 1104). This processing is substantially the same as the above-described preamble detection processing. The calculation result of the step 1104 is also inputted into step 1105. Subsequently, in a frame start position/symbol start position determination step (step 1105), the start position of the data frame and a symbol start position are determined in accordance with results from the respective steps.

Next a processing flow of the frame start detection unit 905 with the fluctuation of the number of symbols of the preamble, which can be used in the frame synchronization processing, will be described. One example is assumed in which a preamble series originally including a repetition of ten symbols and having a sample length D of one symbol is given. At this time, it is assumed that detection precision of the received frame edge is bad, and the number of preambles, which can be used in the frame synchronization processing, fluctuates. Additionally, the number of preambles S that can be used in the synchronization processing is assumed to be four at minimum, and six at maximum. Here, the case on the above-described conditions will be described. However, even with any fluctuation of the number of preambles, which can be used in the frame synchronization processing, it is similarly possible to detect the start position of the data frame.

FIGS. 13A to 13D are timing charts showing the processing content for four symbols of the preamble in the frame synchronization device in the second embodiment. Moreover, FIGS. 14A to 14D are timing charts showing the processing content for six symbols of the preamble in the frame synchronization device in the second embodiment. In these drawings, S denotes one symbol of the received preamble, and t0 denotes a received frame edge detection time. It is to be noted that in the same manner as in FIGS. 11A to 11D, the delay time accompanying each processing is not considered here.

In FIGS. 13A to 13D, a case in which the first one of ten symbols is missed is assumed. As shown in FIGS. 13A and 13B, the number of symbols of the preamble which can be used for the frame synchronization processing after an elapse of time P1 is four. Since there are four peaks of a frame position detection processing output as shown in FIG. 13B, there are also four peaks of a moving average output of FIG. 13C. Moreover, since four symbols are used in the frame synchronization, for the preamble detection processing output of FIG. 13D, a period having a constant maximum value is 2D.

Contrary to FIGS. 13A to 13D, FIGS. 14A to 14D show a case in which the frame edge is detected earlier by one preamble S. In this case, as shown in FIGS. 14A and 14B, the number of symbols of the preamble which can be used for the frame synchronization processing after the elapse of time P1 is six. Therefore, there are six peaks of the moving average output in FIG. 14C. For the preamble detection processing output of FIG. 14D, the period having the constant maximum value is 4D.

Figure 15:
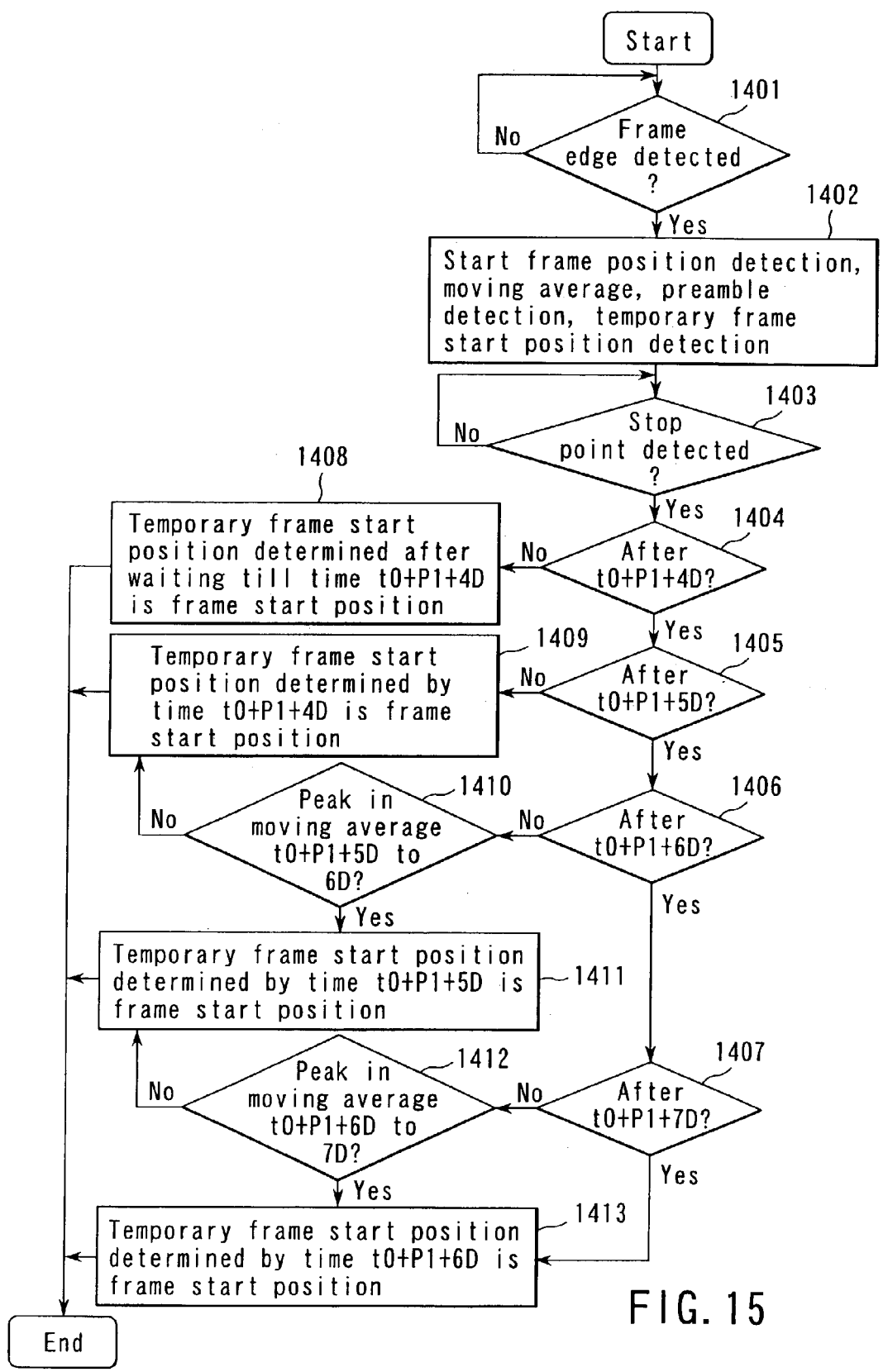
FIG. 15 is a flowchart showing the flow of the concrete processing of the frame synchronization device in the second embodiment.

A flow for determining the frame start position or symbol start position by the data frame start detection unit 905 of FIG. 10, including the above-described cases, will be described. FIG. 15 shows the processing flow.

First the received frame edge is detected (step 1401). When the received frame edge is detected, an instruction is made for frame position detection, moving average, preamble detection, or temporary frame start position detection for performing the frame position detection to temporarily obtain the frame start position (step 1402). Next a time to end the preamble series, that is, a stop point is detected (step 1403). The stop point is detected, and a time when the stop point is detected is decided.

When the stop point is detected before t0+P1+4D (step 1404), that is, in a case shown in FIGS. 13A to 13D, at least t0+P1+4D is waited for, the detected temporary frame start position is used as such as the data frame start position (step 1408), and the processing is ended. When the stop point is before t0+P1+5D (step 1405), the temporary frame start position detected by t0+P1+4D is used as the data frame start position (step 1409). When the preamble can be detected as scheduled, that is, when the stop point is before t0+P1+6D (step 1406), and when the peak in output of the moving average is recognized between t0+P1+5D and t0+P1+6D (step 1410), the temporary frame start position determined by t0+P1+5D is used (step 1411). If not, the temporary frame start position determined by t0+P1+4D is used as the data frame start position (step 1409).

Finally, when the stop point is detected before t0+P1+7D (step 1407), it is decided whether there is a peak between t0+P1+6D and t0+P1+7D (step 1412). When there is not the peak, the temporary frame start position determined by t0+P1+5D is used (step 1411). When there is the peak, the position determined by t0+P1+6D is used as the data frame start position (step 1413). When the stop point is recognized after t0+P1+7D, the temporary frame start position determined by t0+P1+6D is used as the data frame start position (step 1413), and the processing ends.

By the detection of the frame start position by the above-described method, even with the fluctuation of the number of symbols of the preamble which can be used in the frame synchronization processing, the position can uniquely be determined. Moreover, the position is not influenced by the number of symbols of the preamble. Therefore, even in the use environment in which the detection precision of the received frame edge is deteriorated, it is possible to correctly detect the data frame start position.

(Third Embodiment)

Figure 16:
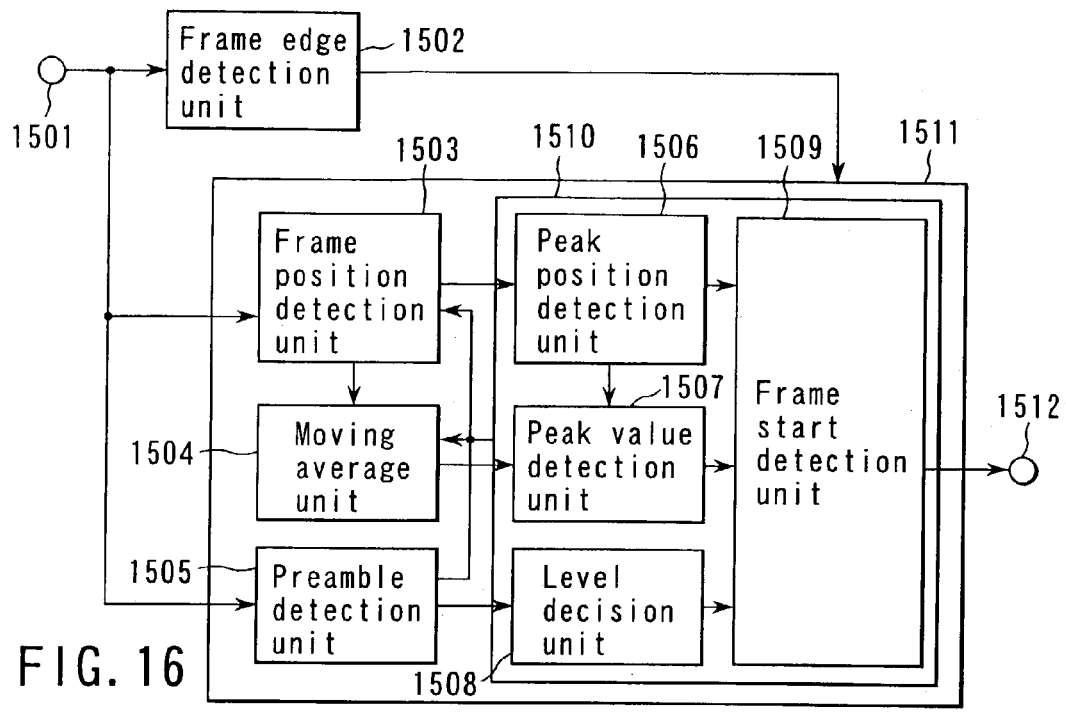
FIG. 16 is a block diagram showing the constitution of the frame synchronization device in a third embodiment of the present invention.

FIG. 16 is a block diagram showing the constitution of the frame synchronization device in a third embodiment of the present invention. In FIG. 16, the received signal given to an input terminal 1501 is inputted into a frame edge detection unit 1502 and frame start detection processing unit 1511. The frame edge detection unit 1502 detects the rising edge of a received frame from the input signal, and outputs the detected signal into a frame start detection unit 1510. The frame start detection processing unit 1511 includes a frame position detection unit 1503 which detects the start position of a data frame, a moving average unit 1504 which moves/adds the detected results, a preamble detection unit 1505 which detects the preamble sent prior to the transmission data, and the frame start detection unit 1510 which uses these detected results to detect the start position of the data frame. Moreover, the frame start detection unit 1510 also has a function of instructing the start of processing with respect to the frame position detection unit 1503, preamble detection unit 1505, and moving average unit 1504 based on the signal from the frame edge detection unit 1502. The output of the frame position detection unit 1503 is inputted into a peak position detection unit 1506 of the frame start detection unit 1510, and the peak position of the input signal is detected. A peak value detection unit 1507 of the frame start detection unit 1510 detects a peak value from an output signal of the moving average unit 1504 based on the output of the moving average unit 1504 and the result of the peak position detection unit 1506. Additionally, for the output of the preamble detection unit 1505, a level is decided in a level decision unit 1508. Moreover, output results of the peak position detection unit 1506, peak value detection unit 1507, and level decision unit 1508 form the input of a frame start position determination unit 1509, and determines the start position of the data frame.

In the third embodiment, the peak position detection unit 1506, peak value detection unit 1507, and level decision unit 1508 are further added to the constitution of FIG. 10 which shows the second embodiment.

Next, the state in which the frame start detection unit 1510 of FIG. 16 detects the data frame start position of the received signal will be described with reference to FIGS. 17A to 17G. FIGS. 17A to 17G show the outputs of the respective units with respect to the input signal. In the drawings, t0 denotes the time when the received signal arrives, and D indicates the sample length of one symbol of the preamble. As shown in FIG. 17A, it is assumed that ten symbols have arrived as the preamble. Upon receiving the signal, the frame edge detection unit 1502 of FIG. 16 detects the frame edge including the first symbol of the preamble, and outputs the start signal to the frame start detection unit 1510. The frame start detection unit 1510 which has received the output waits for PI period corresponding to the top five symbols of the preamble, and instructs the frame position detection unit 1503, moving average unit 1504, and preamble detection unit 1505 to start each processing. The symbol of the preamble obtained in the period P1 is used for adjusting the gain of the receiver, and is not used in processing the frame synchronization.

The frame position detection unit 1503, which has started the operation after P1 period correlates the input signal with the known preamble series as, described above, and outputs the result shown in FIG. 17B. Since five symbols can be used for the frame synchronization, five peaks are shown. It is to be noted that the influence of the delay time generated by the processing is not considered in the respective signals shown in FIGS. 17A to 17G.

The signal is also inputted into the moving average unit 1504, and subjected to the moving average processing. Here, it is assumed that for the moving average sample W less than the sample D, the constant output is obtained. The output result at this time is shown in FIG. 17C. FIG. 17C shows five peaks each having the width corresponding to the sample W.

By this moving average processing, even with the use of the radio device under the multi-path environment in which the direct and delay waves are multiplexed and arrive with the generated time deviation, the peak position of the processing result is not dispersed and the original peak position can correctly be detected. When the peak position can correctly be detected, it is possible to prevent to detect the erroneous data frame detection point.

Moreover, the input signal is also processed with respect to the preamble detection unit 1505, and the result shown in FIG. 17D is outputted. Since five symbols can be used for the frame synchronization, as a result the constant value is outputted over the 3D sample period.

The peak position detection unit 1506 outputs timing signal of the maximum value, when the output result of the frame position detection unit 1503 indicates the peak. This state is shown in FIG. 17E. Moreover, the peak value detection unit 1507 checks the output result from the moving average unit 1504 at the timing (=temporary frame start position) of the output of the peak position detection unit 1506. At this time a peak value P of the output of the moving average unit 1504 in time t0+nD (n: integer) and an output Q of the moving average unit 1504 in time t0+nD−D/2 are compared. If P>TH1×Q is established, it is decided that the peak exists in the time t0+nD. On the other hand, when the above-described equation is not established, it is decided that the peak does not exist. At this time TH1 indicates a predetermined threshold value constant. A state of threshold value decision is shown in FIG. 17F.

Similarly the output of the preamble detection unit 1505 is subjected to threshold value decision by the level decision unit 1508. In FIG. 17G, an average value of X samples in a section in which the output result of the preamble detection unit 1505 is kept at a constant maximum value is assumed to be Y, a preset threshold value coefficient is TH2, and the output of the preamble detection unit 1505 is Z. The frame edge detection result of the frame edge detection unit 1502 is used as a trigger to calculate the average value Y of X samples of the section in which the output of the preamble detection unit 1505 is kept to be constant at the maximum value. After the calculation, an output result Z of the preamble detection unit 1505 is compared with TH2×Y. Subsequently, a time when Z decreases to satisfy Z<TH2×Y is determined. It can be decided that the time is roughly the end of the preamble series.

On receiving the output results of FIGS. 17E, 17F, and 17G as described above, the frame start position determination unit 1509 detects the frame start position with respect to one symbol in the sample D of the preamble S, and the final symbol of the repeated preamble data series. The frame start position obtained in this manner is used as the temporary frame start position of the data frame subsequent to the preamble. Moreover, when the end of the preamble is detected, the start of the data frame can be detected. Based on these, the frame start position determination unit 1509 determines the final data frame start position, and outputs the frame synchronization establishment signal to an output terminal 1512.

Figure 18:
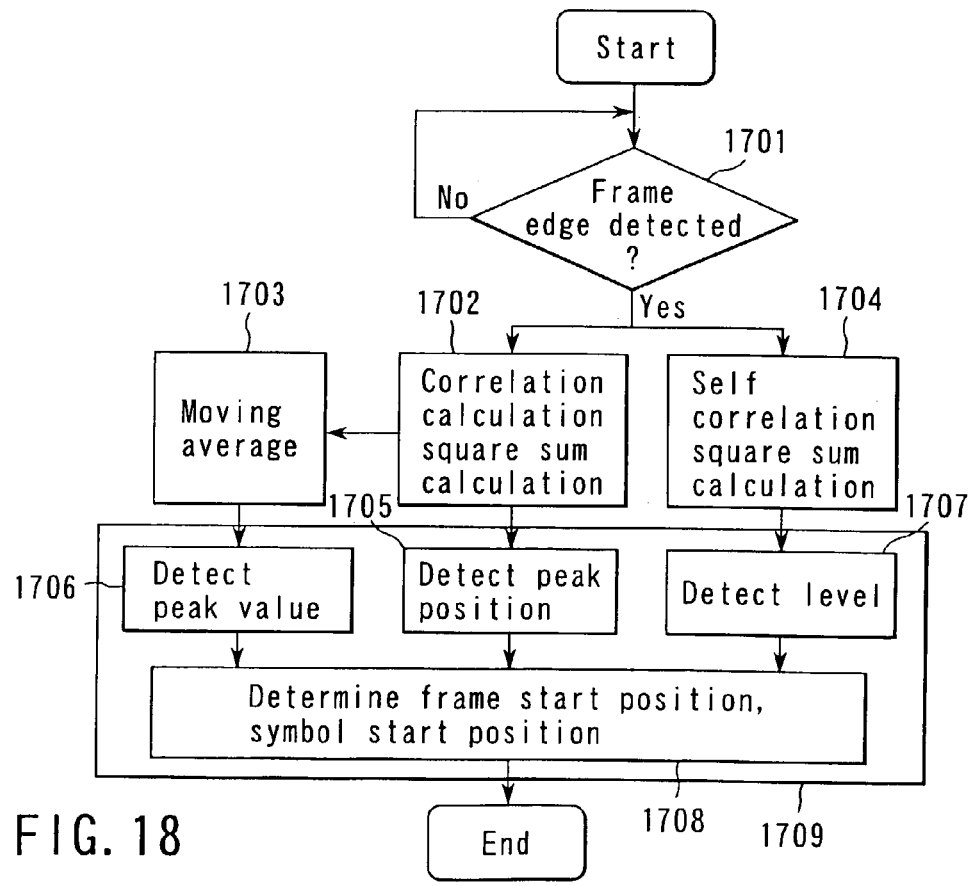
FIG. 18 is a flowchart showing the flow of the processing of the frame synchronization device in the third embodiment.

FIG. 18 is a flowchart showing the flow of the processing of the frame synchronization device in the third embodiment. First the frame edge of the preamble sent prior to the received data is detected (step 1701). When the frame edge is detected, the correlation calculation and square sum calculation are next performed (step 1702). This processing is performed substantially for the detection processing of the frame position. Subsequently, this result is inputted into peak position detection (step 1705), and subjected to the moving average (step 1703) to form the signal, which has the peak with the constant time interval. The signal is inputted into peak value detection (step 1706), and the peak position of the signal is detected. For the signal inputted into the peak position detection (step 1705), the value in the peak time of the detected signal is tested by the above-described method and it is decided whether or not there is the peak. Additionally, the frame edge detection result obtained in the step 1701 is subjected to the self correlation square sum calculation (step 1704). This processing is substantially the same as the above-described preamble detection processing. The calculation result of the step 1704 is inputted into level decision (step 1707), and the level is decided in the above-described method.

Subsequently, in a frame start position, symbol start position determination step (step 1708), the start position of the received frame and the symbol start position are determined in accordance with the results from the respective steps.

Next the processing flow of the frame start detection unit 1510 with the fluctuation of the number of symbols of the preamble, which can be used in the frame synchronization processing, will be described. One example is assumed in which the preamble data series originally including the repetition of ten symbols and having the sample length D of one symbol is given. At this time, it is assumed that detection precision of the received frame edge is bad, and the number of preambles, which can be used in the frame synchronization processing, fluctuates. Additionally, the number of preambles S which can be used in the synchronization processing is assumed to be four at minimum, and six at maximum. Here, the case on the above-described conditions will be described. However, even with any fluctuation of the number of preambles, which can be used in the frame synchronization processing, it is similarly possible to detect the start position of the data frame.

FIGS. 19A to 19D are timing charts showing the processing content for four symbols of the preamble in the frame synchronization device in the third embodiment. Moreover, FIGS. 20A to 20D are timing charts showing the processing content for six symbols of the preamble in the frame synchronization device in the third embodiment. In these drawings, S denotes one symbol of the received preamble, and t0 denotes the received frame edge detection time. It is to be noted that in the same manner as in FIGS. 11A to 11D, the delay time accompanying each processing is not considered here.

In FIGS. 19A to 19D, the case in which the first one of ten symbols is missed is assumed. As shown in FIGS. 19A and 19B, the number of symbols of the preamble which can be used for the frame synchronization processing after the elapse of time P1 is four. Since there are four peaks of the frame position detection processing output as shown in FIG. 19B, there are also four peaks of the moving average output of FIG. 19C. Moreover, since four symbols are used in the frame synchronization, for the preamble detection processing output of FIG. 19D, the period having the constant maximum value is 2D.

For the output result of FIG. 19C, the threshold value is decided. At this time the peak value P of the output of the moving average unit 1504 in the time t0+nD (n: integer) and the output Q of the moving average unit 1504 in the time t0+nD−D/2 are compared. If P>TH1×Q is established, it is decided that the peak exists in the time t0+nD. On the other hand, when the above-described equation is not established, it is decided that the peak does not exist. At this time TH1 indicates the preset threshold value constant. The state of the threshold value decision is shown in FIG. 19C.

Similarly the output of the preamble detection unit 1505 is subjected to the threshold value decision by the level decision unit 1508. In FIG. 19D, the average value of 2D samples in a section in which the output result of the preamble detection unit 1505 is kept at the constant maximum value is assumed to be Y, the preset threshold value coefficient is TH2, and the output of the preamble detection unit 1505 is Z. The frame edge detection result of the frame edge detection unit 1502 is used as the trigger to calculate the average value Y of 2D samples of the section in which the output of the preamble detection unit 1505 is kept to be constant at the maximum value. After the calculation, the output result Z of the preamble detection unit 1505 is compared with TH2×Y. Subsequently, the time when Z decreases to satisfy Z<TH2×Y is determined. It can be decided that the time is roughly the end of the preamble series.

Figure 21:
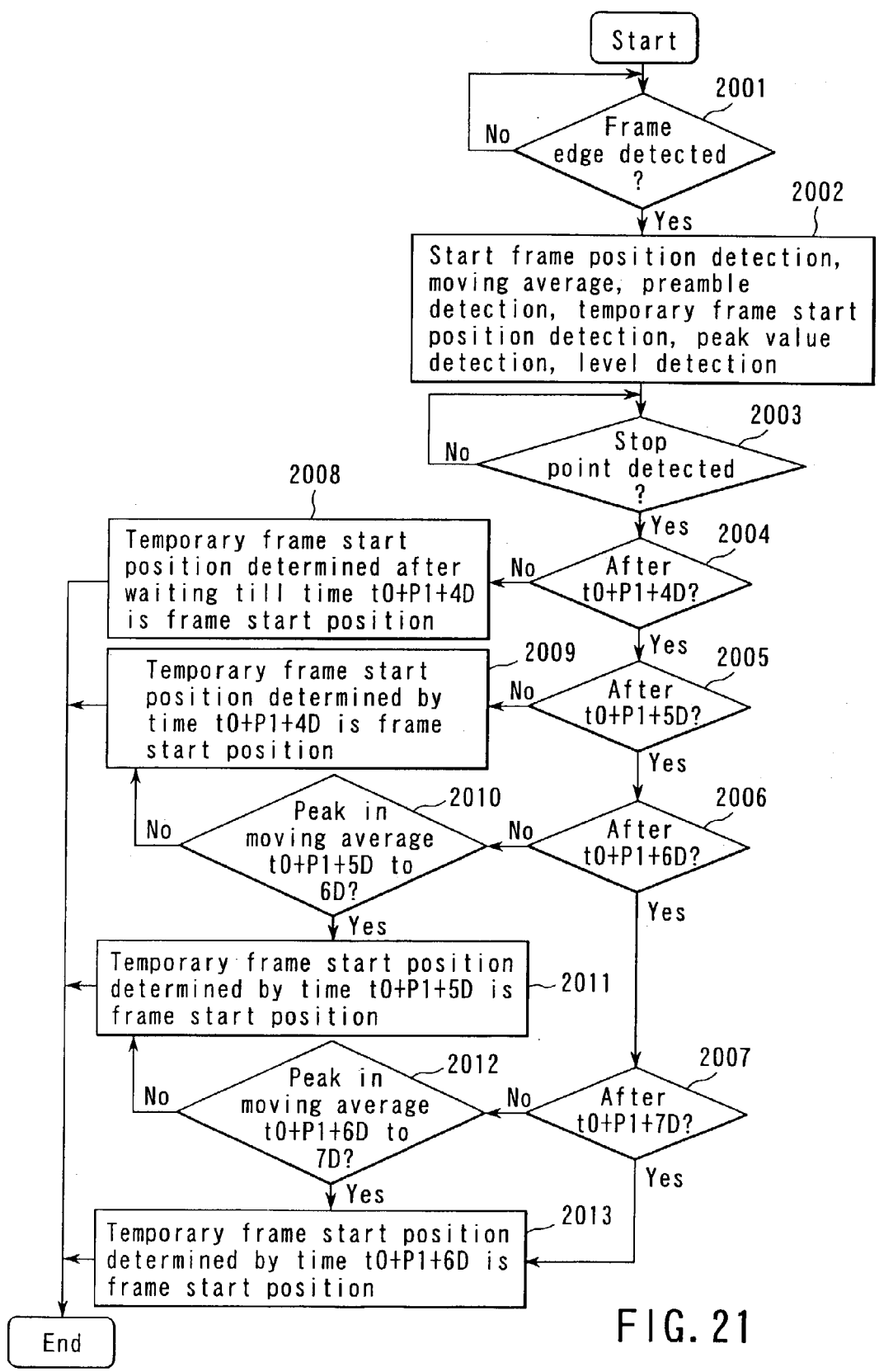
FIG. 21 is a flowchart showing the flow of the concrete processing of the frame synchronization device in the third embodiment.

Contrary to FIGS. 19A to 19D, FIGS. 20A to 20D show the case in which the frame edge is detected earlier by one preamble S. In this case, as shown in FIGS. 20A and 20B, the number of symbols of the preamble which can be used for the frame synchronization processing after the elapse of the time P1 is six. Therefore, there are six peaks of the moving average output in FIG. 20C. For the preamble detection output shown FIG. 20D, the period having the constant maximum value is 4D. The flow for determining the frame start position or symbol start position by the frame start detection unit 1511 of FIG. 16, including the above-described cases, will be described. FIG. 21 shows the processing flow.

First, the received frame edge is detected (step 2001). When the received frame edge is detected, the instruction is made for the frame position detection, moving average, preamble detection, frame position detection, peak value detection, or level detection (step 2002). Next the time to end the preamble series, that is, the stop point is detected (step 2003). The stop point is detected, and the time when the stop point is detected is decided. When the stop point is detected before t0+P1+4D (step 2004), that is, in a case shown in FIGS. 19A to 19D, at least t0+P1+4D is waited for, the detected temporary frame start position is used as such as the data frame start position (step 2008), and the processing is ended. When the stop point is before t0+P1+5D (step 2005), the temporary frame start position detected by t0+P1+4D is used as the data frame start position (step 2009). When the stop point is before t0+P1+6D (step 2006), and when the peak in output of the moving average is recognized between t0+P1+5D and t0+P1+6D (step 2010), the temporary frame start position determined by t0+P1+5D is used (step 2011). If not, the temporary frame start position determined by t0+P1+4D is used as the data frame start position (step 2009).

Finally, when the stop point is detected before t0+P1+7D (step 2007), it is decided whether there is a peak between t0+P1+6D and t0+P1+7D (step 2012). When there is not the peak, the temporary frame start position determined by t0+P1+5D is used (step 2011). When there is the peak in output of the moving average, the position determined by t0+P1+6D is used as the data frame start position (step 2013). When the stop point is recognized after t0+P1+7D, the temporary frame start position determined by t0+P1+6D is used as the data frame start position (step 2013), and the processing ends.

By the detection of the data frame start position by the above-described method, even with the fluctuation of the number of symbols of the preamble which can be used in the frame synchronization processing, the position can uniquely be determined. Moreover, the position is not influenced by the number of symbols of the preamble. Therefore, even in the use environment in which the detection precision of the received frame edge is deteriorated, it is possible to correctly detect the data frame start position.

(Fourth Embodiment)

Figure 22:
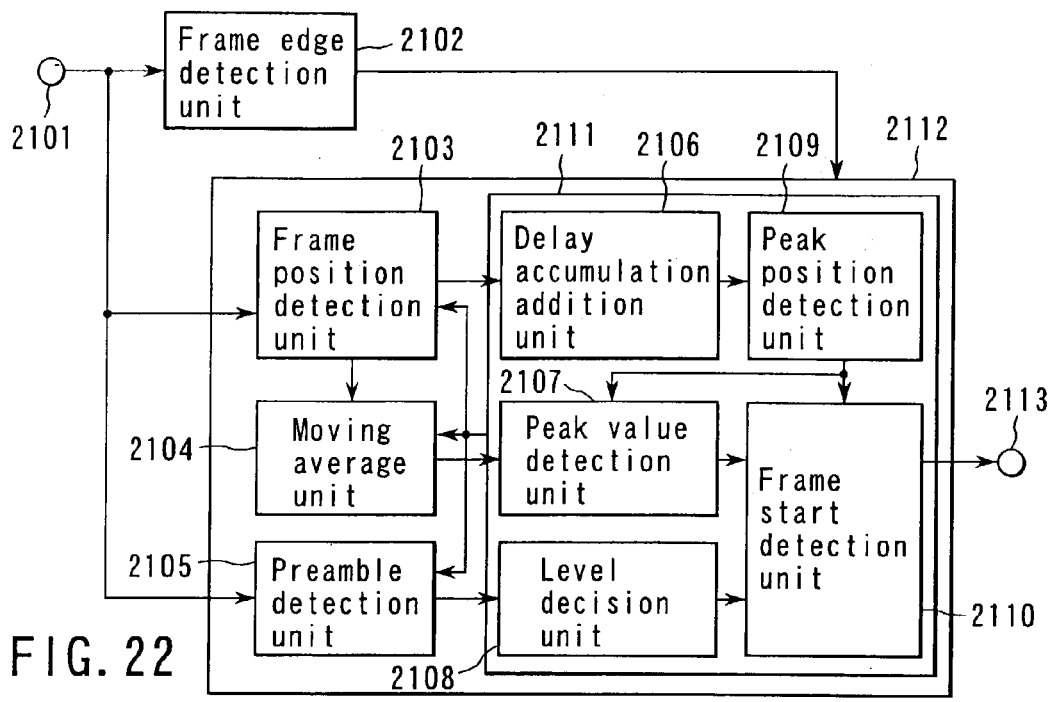
FIG. 22 is a block diagram showing the constitution of the frame synchronization device in a fourth embodiment of the present invention.

FIG. 22 is a block diagram showing the constitution of the frame synchronization device in a fourth embodiment of the present invention. In FIG. 22, the received signal given to an input terminal 2101 is inputted into a frame edge detection unit 2102 and frame start detection processing unit 2112. The frame edge detection unit 2102 detects the rising edge of a received frame from the input signal, and inputs the signal into a frame start detection unit 2111. The frame start detection processing unit 2112 includes a frame position detection unit 2103 which detects the start position of a data frame, a moving average unit 2104 which moves/adds the detected results, a preamble detection unit 2105 which detects the preamble sent prior to the transmission data, and the frame start detection unit 2111 which uses these detected results to detect the start position of the received frame. Moreover, the frame start detection unit 2111 also has a function of instructing the start of processing with respect to the frame position detection unit 2103, preamble detection unit 2105, and moving average unit 2104 based on the signal from the frame edge detection unit 2102. The output of the frame position detection unit 2103 is inputted into a peak position detection unit 2109 via a delay accumulation addition unit 2106 of the frame start detection unit 2111, and the peak position of the input signal is detected. A peak value detection unit 2107 of the frame start detection unit 2111 detects the peak value from the output signal of the moving average unit 2104 based on the output of the moving average unit 2104 and the result of the peak position detection unit 2109. Additionally, for the output of the preamble detection unit 2105, the level is decided in a level decision unit 2108. Moreover, the output results of the peak position detection unit 2109, peak value detection unit 2107, and level decision unit 2108 form the input of a frame start position determination unit 2110, and determines the start position of the data frame.

In the fourth embodiment, the delay accumulation addition unit 2106, which has a function of accumulating the output of the frame position detection unit 2103, is further added to the constitution of FIG. 16, which shows the third embodiment.

Next, the state in which the frame start detection unit 2111 of FIG. 22 detects the data frame start position from the received signal will be described with reference to FIGS. 23A to 23H. FIGS. 23A to 23H show the outputs of the respective units with respect to the input signal. In the drawings, t0 denotes the time when the received signal arrives, and D indicates the sample length of one symbol of the preamble. As shown in FIG. 23A, it is assumed that ten symbols have arrived as the preamble. Upon receiving the signal, the frame edge detection unit 2102 of FIG. 22 detects the frame edge including the first symbol of the preamble, and outputs the start signal to the frame start detection unit 2111. The frame start detection unit 2111 which has received the output waits for P1 period corresponding to the top five symbols of the preamble, and instructs the frame position detection unit 2103, moving average unit 2104, and preamble detection unit 2105 to start each processing. The symbol of the preamble obtained in the period P1 is used for adjusting the gain of the receiver, and is not used in processing the frame synchronization.

The frame position detection unit 2103, which has started the operation after P1 period correlates the input signal with the known preamble series as, described above, and outputs the result shown in FIG. 23B. Since five symbols can be used for the frame synchronization, five peaks are shown. It is to be noted that the influence of the delay time generated by the processing is not considered in the respective signals shown in FIGS. 23A to 23H.

The signal is also inputted into the moving average unit 2104, and subjected to the moving average processing. Here, it is assumed that for the moving average sample W less than the sample D, the constant output is obtained. The output result at this time is shown in FIG. 23C. FIG. 23C shows five peaks each having the width corresponding to the sample W.

By this moving average processing, even with the use of the radio device under the multi-path environment in which the direct and delay waves are multiplexed and arrive with the generated time deviation, the peak position of the processing result is not dispersed and the original peak position can correctly be detected. When the peak position can correctly be detected, it is possible to prevent to detect the erroneous data frame start point.

Moreover, the input signal is also processed with respect to the preamble detection unit 2105, and the result shown in FIG. 23D is outputted. Since five symbols can be used for the frame synchronization, as a result the constant value is outputted over the 3D sample period.

The delay accumulation addition unit 2106 uses the output of the frame position detection unit 2103 that is an input, and accumulates the output and its own output delayed by the sample D. That is, when the input continues to be given at an interval D, the output is superimposed corresponding to the number of inputs. This state is shown in FIG. 23E.

The peak position detection unit 2109 uses the output of the delay accumulation addition unit 2106 that is the input, and outputs timing signal of the maximum value, only when the input indicates the peak. This state is shown in FIG. 23F. Moreover, the peak value detection unit 2107 checks the output result from the moving average unit 2104 at the timing (=temporary frame start position) of the output of the peak position detection unit 2109. At this time the peak value P of the output of the moving average unit 2104 in the time t0+nD (n: integer) and the output Q of the moving average unit 2104 in the time t0+nD−D/2 are compared. If P>TH1×Q is established, it is decided that the peak exists in the time t0+nD. On the other hand, when the above-described relation is not established, it is decided that the peak does not exist. At this time TH1 indicates the preset threshold value constant. The state of the threshold value decision is shown in FIG. 23G.

Similarly the output of the preamble detection unit 2105 is subjected to the threshold value decision by the level decision unit 2108. In FIG. 23H, the average value of X samples in the section in which the output result of the preamble detection unit 2105 is kept at the constant maximum value is assumed to be Y, the preset threshold value coefficient is TH2, and the output of the preamble detection processing unit 2105 is Z. The frame edge detection result of the frame edge detection unit 2102 is used as the trigger to calculate the average value Y of the X samples of the section in which the output of the preamble detection unit 2105 is kept to be constant at the maximum value. After the calculation, the output result Z of the preamble detection unit 2105 is compared with TH2×Y. Subsequently, the time when Z decreases to satisfy Z<TH2×Y is determined. It can be decided that the time is roughly the end of the preamble series.

On receiving the output results of FIGS. 23F, 23G, and 23H as described above, the frame start position determination unit 2110 detects the frame start position with respect to one symbol in the sample D of the preamble S, and the final symbol of the repeated preamble series. The frame start position obtained in this manner is used as the temporary frame start position of the data frame subsequent to the preamble. Moreover, when the end of the preamble is detected, the start of the data frame can be detected. Based on these, the frame start position determination unit 2110 determines the final frame start position, and outputs the frame synchronization establishment signal to an output terminal 2113.

Here, an advantage obtained by disposing the delay accumulation addition unit 2106 shown in FIG. 22 will be described with reference to FIGS. 24A to 24C. FIGS. 24A to 24C show five symbols of the preamble, which can be used in the frame synchronization processing. The first peak in the sample D in output of the frame position detection unit 2103 is assumed to be detected at the time t0+5D+k. Then, the subsequent peak of four symbols must appear as t0+6D+k, t0+7D+k, t0+8D+k, t0+9D+k. However, as shown in FIGS. 24A to 24C, the symbol, which must arrive at t0+7D+k, is considered to be detected by a time of +1 for some reason. In this case, when t0+7D+k+1 is used in the peak used as the final frame start position, time deviating by +1 is detected. Depending on the circumstances, the data frame following the preamble cannot correctly be synchronized. One example of the output obtained using the delay accumulation addition unit 2106 to process the signal of FIG. 24B is shown in FIG. 24C. As shown herein, t0+5D+k, t0+6D+k, t0+8D+k excluding t0+7D+k and indicating the original frame start position are added/superimposed for each sample D, and a higher output is obtained. At this time, the peak generated by the value at time t0+7D+k+1 when the deviation is generated is compared with the peak generated by the value of the original frame position, and the value with a higher peak (3H in FIG. 24C) may be selected. Thereby, even when the symbol of the preamble S for use in the frame synchronization processing deviates in time, it is possible to detect the correct data frame start position.

Figure 25:
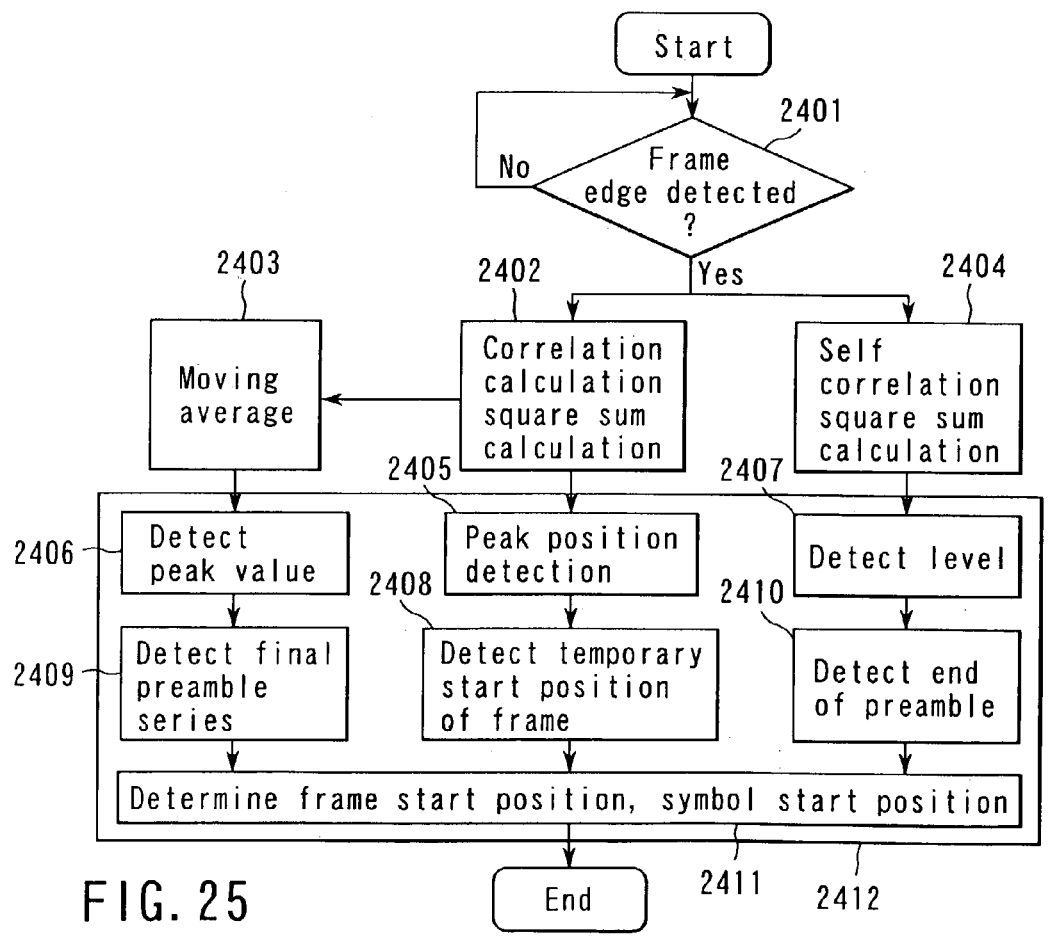
FIG. 25 is a flowchart showing the flow of the concrete processing of the frame synchronization device in the fourth embodiment.

FIG. 25 is a flowchart showing the flow of the concrete processing of the frame synchronization device in the fourth embodiment. First the frame edge of the preamble sent prior to the received data is detected (step 2401). When the frame edge is detected, the correlation calculation and square sum calculation are next performed (step 2402). This processing is performed substantially for the detection processing of the frame position. Subsequently, this result is inputted into the peak position detection (step 2405), and subjected to the moving average (step 2403) to form the signal, which has the peak with the constant time interval. The signal is inputted into peak value detection (step 2406), and the peak position of the signal is detected. Furthermore, the final preamble series is detected from the signal (step 2409). For the signal inputted into the peak position detection (step 2405), the value in the peak time of the detected signal is tested by the above-described method and it is decided whether or not there is the peak. Furthermore, depending on the circumstances, at least a largest peak is selected from the peaks that appear in the sample D (step 2408). Additionally, the frame edge detection result obtained in the step. 2401 is subjected to the self correlation square sum calculation (step 2404). This processing is substantially the same as the above-described preamble detection processing. The calculation result of the step 2404 is inputted into the level decision (step 2407), and the level is decided in the above-described method. Based on the decision result, a position where the output falls is detected as the end of the preamble (step 2410).

Subsequently, in a frame start position, symbol start position determination step (step 2411), the start position of the received frame and the symbol start position are determined in accordance with the results from the respective steps.

Next the processing flow of the frame start detection unit 2111 with the fluctuation of the number of symbols of the preamble, which can be used in the frame synchronization processing, will be described. One example is assumed in which the preamble series originally including the repetition of ten symbols and having the sample length D of one symbol is given. At this time, it is assumed that the detection precision of the frame edge is bad, and the number of preambles, which can be used in the frame synchronization processing, fluctuates. Additionally, the number of preambles S that can be used in the synchronization processing is assumed to be four at minimum, and six at maximum. Here, the case on the above-described conditions will be described. However, even with any fluctuation of the number of preambles, which can be used in the frame synchronization processing, it is similarly possible to detect the start position of the data frame.

FIGS. 26A to 26E are timing charts showing the processing content for four symbols of the preamble in the frame synchronization device in the fourth embodiment. Moreover, FIGS. 27A to 27E are timing charts showing the processing content for six symbols of the preamble in the frame synchronization device in the fourth embodiment. In these drawings, S denotes one symbol of the received preamble, and t0 denotes the received frame edge detection time. It is to be noted that in the same manner as in FIGS. 11A to 11D, the delay time accompanying each processing is not considered here.

In FIGS. 26A to 26E, the case is assumed in which the first one of ten symbols is missed. As shown in FIGS. 26A and 26B, the number of symbols of the preamble which can be used for the frame synchronization processing after the elapse of time P1 is four. Four peaks are delayed/accumulated/added at the interval of the sample D, and a large signal is successively obtained as shown in FIG. 26C. Since there are four peaks of the frame position detection processing output in FIG. 26B, there are also four peaks of the moving average output of FIG. 26D. Moreover, since four symbols are used in the frame synchronization, for the preamble detection processing output of FIG. 26E, the period having the constant maximum value is 2D.

For the output result of FIG. 26D, the threshold value is decided. At this time the peak value P of the output of the moving average unit 2104 in the time t0+nD (n: integer) and the output Q of the moving average unit 2104 in the time t0+nD−D/2 are compared. If P>TH1×Q is established, it is decided that the peak exists in the time t0+nD. On the other hand, when the above-described equation is not established, it is decided that the peak does not exist. At this time TH1 indicates the preset threshold value constant. The state of the threshold value decision is shown in FIG. 26D.

Similarly the output of the preamble detection unit 2105 is subjected to the threshold value decision by the level decision unit 2108. In FIG. 26E, the average value of 2D samples in the section in which the output result of the preamble detection unit 2105 is kept at the constant maximum value is assumed to be M, the preset threshold value coefficient is TH2, and the output of the preamble detection unit 2105 is Z. The frame edge detection result of the frame edge detection unit 2102 is used as the trigger to calculate the average value M of 2D samples of the section in which the output of the preamble detection unit 2105 is kept to be constant at the maximum value. After the calculation, the output result Z of the preamble detection processing unit 2105 is compared with TH2×M. Subsequently, the time when Z decreases to satisfy Z<TH2×M is determined. It can be decided that the time is roughly the end of the preamble series.

Figure 28:
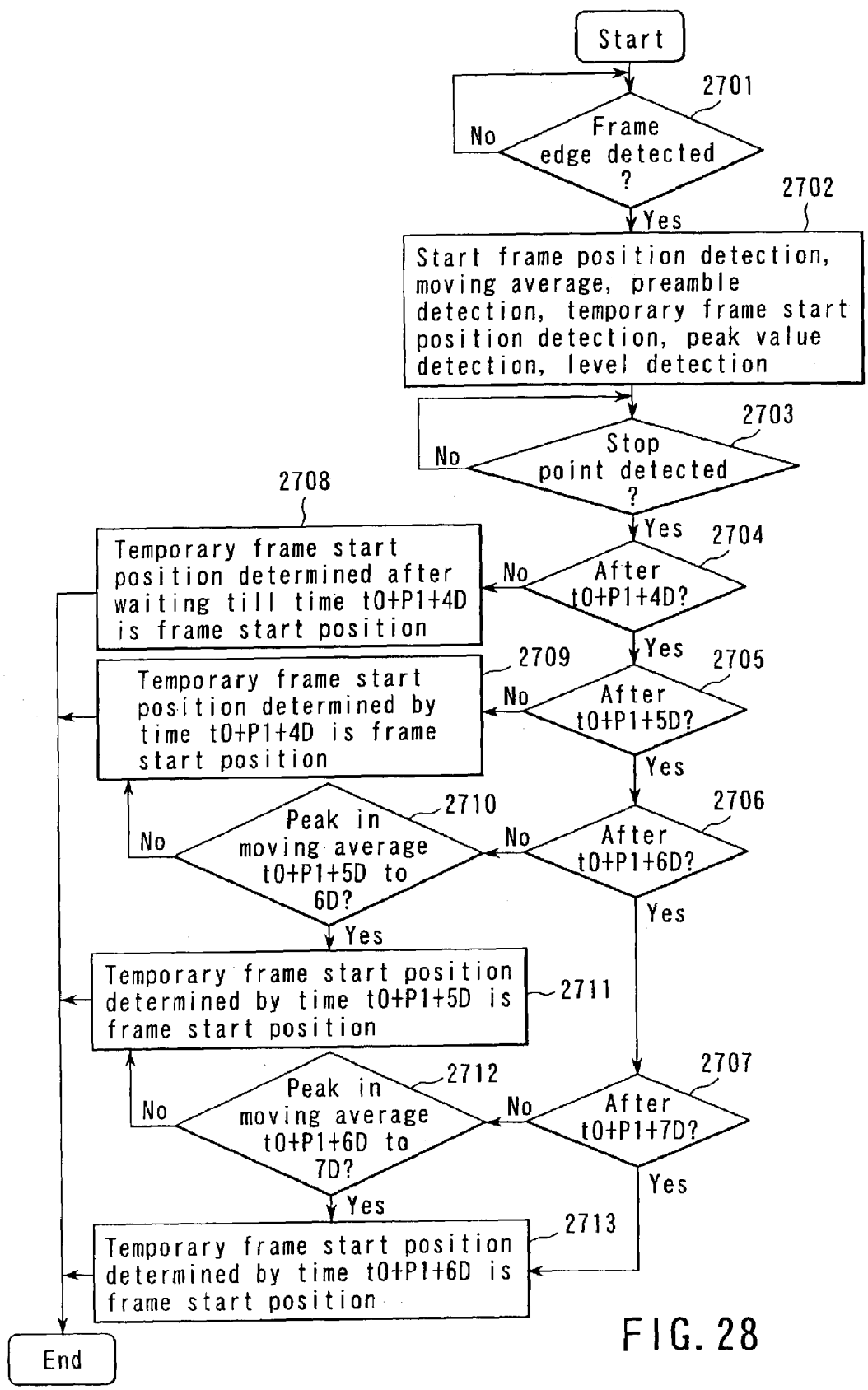
FIG. 28 is a flowchart showing the flow of the concrete processing of the frame synchronization device in the fourth embodiment.

Contrary to FIGS. 26A to 26E, FIGS. 27A to 27E show the case in which the frame edge is detected earlier by one preamble S. In this case, as shown in FIGS. 27A and 27B, the number of symbols of the preamble which can be used for the frame synchronization processing after the elapse of the time P1 is six. Therefore, there are six peaks of the moving average output in FIG. 27B. For the preamble detection processing output of FIG. 27E, the period having the constant maximum value is 4D. The flow for determining the frame start position or symbol start position by the frame start detection unit 2111 of FIG. 22, including the above-described cases, will be described. FIG. 28 shows the processing flow.

First, the received frame edge is detected (step 2701). When the received frame edge is detected, the instruction is made for the frame position detection, moving average, preamble detection, frame position detection, peak value detection, or level detection (step 2702). Next the time to end the preamble series, that is, the stop point is detected (step 2703). The stop point is detected, and the time when the stop point is detected is decided. When the stop point is detected before t0+P1+4D (step 2704), that is, in a case shown in FIGS. 26A to 26E, at least t0+P1+4D is waited for, the detected temporary frame start position is used as such as the data frame start position (step 2708), and the processing is ended. When the stop point is before t0+P1+5D (step 2705), the temporary frame start position detected by t0+P1+4D is used as the data frame start position (step 2709). When the stop point is before t0+P1+6D (step 2706), and when the peak in output of the moving average is recognized between t0+P1+5D and t0+P1+6D (step 2710), the temporary frame start position determined by t0+P1+5D is used (step 2711). If not, the temporary frame start position determined by t0+P1+4D is used as the data frame start position (step 2709).

Finally, when the stop point is detected before t0+P1+7D (step 2707), it is decided whether there is a peak between t0+P1+6D and t0+P1+7D (step 2712). When there is not the peak, the temporary frame start position determined by t0+P1+5D is used (step 2711). When there is the peak, the position determined by t0+P1+6D is used as the data frame start position (step 2713). When the stop point is recognized after t0+P1+7D, the temporary frame start position determined by t0+P1+6D is used as the data frame start position (step 2713), and the processing ends.

By the detection of the frame start position by the above-described method, even with the fluctuation of the number of symbols of the preamble which can be used in the frame synchronization processing, the position can uniquely be determined. Moreover, the position is not influenced by the number of symbols of the preamble. Therefore, even in the use environment in which the detection precision of the received frame edge is deteriorated, it is possible to correctly detect the data frame start position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A frame synchronization device, which receives a received signal that includes a preamble of repeating synchronization symbols, and a data frame following the preamble, the frame synchronization device comprising:
  a first correlation unit configured to repeatedly generate a synchronization symbol, and correlate between the generated synchronization symbols and the received signal to form a first correlation signal;
  a second correlation unit configured to delay the received signal by a time corresponding to a length of the synchronization symbols to form a delay signal, and correlate between the delay signal and the received signal to form a second correlation signal;
  a preamble detector configured to detect a preamble period based on the second correlation signal, and to output a period specifying signal; and
  a generator configured to detect a start time point of the data frame based on the period specifying signal and the first correlation signal, and to generate a frame synchronize signal at substantially the same time of the detection,
  wherein the preamble detector detects a time interval, which is obtained during the second correlation signal, is above a threshold level as the preamble period.

2. A frame synchronization device, which receives a received signal that includes a preamble of repeating synchronization symbols, and a data frame following the preamble, the frame synchronization device comprising:
  a first correlation unit configured to repeatedly generate a synchronization symbol, and correlate between the generated synchronization symbols and the received signal to form a first correlation signal;
  a second correlation unit configured to delay the received signal by a time corresponding to a length of the synchronization symbols to form a delay signal, and correlate between the delay signal and the received signal to form a second correlation signal,
  a preamble detector configured to detect a preamble period based on the second correlation signal, and to output a period specifying signal;
  a generator configured to detect a start time point of the data frame based on the period specifying signal and the first correlation signal, and to generate a frame synchronize signal at substantially the same time of the detection; and
  an edge detector configured to detect a leading edge of the received signal and to generate an edge detection signal,
  wherein the first correlation unit and the second correlation unit start correlation processing when the edge detection signal is generated, and
  wherein the preamble detector detects a time interval, which is obtained during the second correlation signal, is above a threshold level as the preamble period.

3. A frame synchronization device, which receives a received signal that includes a preamble of repeating synchronization symbols, and a data frame following the preamble, the frame synchronization device comprising:
  a first correlation unit configured to repeatedly generate a synchronization symbol, and correlate between the generated synchronization symbols and the received signal to form a first correlation signal;
  a second correlation unit configured to delay the received signal by a time corresponding to a length of the synchronization symbols to form a delay signal, and correlate between the delay signal and the received signal to form a second correlation signal;
  a preamble detector configured to detect a preamble period based on the second correlation signal, and to output a period specifying signal; and
  a generator configured to detect a start time point of the data frame based on the period specifying signal and the first correlation signal, and to generate a frame synchronize signal at substantially the same time of the detection,
  wherein the first correlation unit successively generates a timing signal when the first correlation signal reaches a peak, and
  wherein the generator selects the timing signal at the time when the first correlation signal last reaches the peak within a specified period of time specified by the period specifying signal and detects the start time point of the data frame based on the timing signal.

4. A frame synchronization device, which receives a received signal that includes a preamble of repeating synchronization symbols, and a data frame following the preamble, the frame synchronization device comprising:
  a first correlation unit configured to repeatedly generate a synchronization symbol, and correlate between the generated synchronization symbols and the received signal to form a first correlation signal;
  a second correlation unit configured to delay the received signal by a time corresponding to a length of the synchronization symbols to form a delay signal, and correlate between the delay signal and the received signal to form a second correlation signal;
  a preamble detector configured to detect a preamble period based on the second correlation signal, and to output a period specifying signal; and
  a generator configured to detect a start time point of the data frame based on the period specifying signal and the first correlation signal, and to generate a frame synchronize signal at substantially the same time of the detection,
  wherein the first correlation unit successively generates a timing signal when the first correlation signal reaches a peak, and
  wherein the generator selects the timing signal at the time when the first correlation signal last reaches the peak within a specified period of time specified by the period specifying signal and detects the start time point of the data frame based on the timing signal,
  further including a holder configured to hold the timing signal generated by the first correlation unit during a holding period of time which is shorter than the length of the synchronization symbols, the holder being further configured to output the timing signal to the generator.

5. A frame synchronization device, which receives a received signal that includes a preamble of repeating synchronization symbols, and a data frame following the preamble, the frame synchronization device comprising:
a first correlation unit configured to repeatedly generate a synchronization symbol, and correlate between the generated synchronization symbols and the received signal to form a first correlation signal;
a second correlation unit configured to delay the received signal by a time corresponding to a length of the synchronization symbols to form a delay signal, and correlate between the delay signal and the received signal to form a second correlation signal;
a preamble detector configured to detect a preamble period based on the second correlation signal, and to output a period specifying signal; and
a generator configured to detect a start time point of the data frame based on the period specifying signal and the first correlation signal, and to generate a frame synchronize signal at substantially the same time of the detection,
wherein the first correlation unit successively generates a timing signal when the first correlation signal reaches a peak, and
wherein the generator selects the timing signal at the time when the first correlation signal last reaches the peak within a specified period of time specified by the period specifying signal and detects the start time point of the data frame based on the timing signal;
further including an edge detector configured to detect a leading edge of the received signal and to generate an edge detection signal,
wherein the first correlation unit and the second correlation unit start correlation processing when the edge detection signal is generated.

6. Communication terminal apparatus comprising:
a receiver configured to receive a communication signal as a received signal that includes a preamble of repeating synchronization symbols, and a data frame following the preamble;
a first correlation unit configured to correlate between a synchronization symbol and the received signal obtained by the receiver to form a first correlation signal;
a second correlation unit configured to delay the received signal by a time corresponding to a length of the synchronization symbols to form a delay signal, and correlate between the delay signal and the received signal to form a second correlation signal;
a preamble detector configured to detect a preamble period based on the second correlation signal to output a period specifying signal;
a generator configured to detect a start time point of the data frame based on the period specifying signal and the first correlation signal, and to generate a frame synchronize signal at substantially the same time of the detection; and
a demodulator configured to demodulate the received signal based on the frame synchronize signals,
wherein the preamble detector detects a time interval, which is obtained during the second correlation signal, is above a threshold level as the preamble period.

7. Communication terminal apparatus comprising:
a receiver configured to receive a communication signal as a received signal that includes a preamble of repeating synchronization symbols, and a data frame following the preamble;
a first correlation unit configured to correlate between a synchronization symbol and the received signal obtained by the receiver to form a first correlation signal;
a second correlation unit configured to delay the received signal by a time corresponding to a length of the synchronization symbols to form a delay signal, and correlate between the delay signal and the received signal to form a second correlation signal;
a preamble detector configured to detect a preamble period based on the second correlation signal to output a period specifying signal;
a generator configured to detect a start time point of the data frame based on the period specifying signal and the first correlation signal, and to generate a frame synchronize signal at substantially the same time of the detection;
a demodulator configured to demodulate the received signal based on the frame synchronize signal; and
an edge detector configured to detect a leading edge of the received signal and to generate an edge detection signal,
wherein the first correlation unit and the second correlation unit start correlation processing when the edge detection signal is generated, and
wherein the preamble detector detects a time interval, which is obtained during the second correlation signal, is above a threshold level as the preamble period.

8. Communication terminal apparatus comprising:
a receiver configured to receive a communication signal as a received signal that includes a preamble of repeating synchronization symbols, and a data frame following the preamble;
a first correlation unit configured to correlate between a synchronization symbol and the received signal obtained by the receiver to form a first correlation signal;
a second correlation unit configured to delay the received signal by a time corresponding to a length of the synchronization symbols to form a delay signal, and correlate between the delay signal and the received signal to form a second correlation signal;
a preamble detector configured to detect a preamble period based on the second correlation signal to output a period specifying signal;
a generator configured to detect a start time point of the data frame based on the period specifying signal and the first correlation signal, and to generate a frame synchronize signal at substantially the same time of the detection; and
a demodulator configured to demodulate the received signal based on the frame synchronize signal,
wherein the first correlation unit successively generates a timing signal at the time when the first correlation signal reaches a peak, and
wherein the generator selects the timing signal at the time when the first correlation signal last reaches the peak within a specified period of time specified by the period specifying signal and detects the start time point of the data frame based on the timing signal.

9. Communication terminal apparatus comprising:
a receiver configured to receive a communication signal as a received signal that includes a preamble of repeating synchronization symbols, and a data frame following the preamble;

a first correlation unit configured to correlate between a synchronization symbol and the received signal obtained by the receiver to form a first correlation signal;

a second correlation unit configured to delay the received signal by a time corresponding to a length of the synchronization symbols to form a delay signal, and correlate between the delay signal and the received signal to form a second correlation signal;

a preamble detector configured to detect a preamble period based on the second correlation signal to output a period specifying signal;

a generator configured to detect a start time point of the data frame based on the period specifying signal and the first correlation signal, and to generate a frame synchronize signal at substantially the same time of the detection; and a demodulator configured to demodulate the received signal based on the frame synchronize signal, wherein the first correlation unit successively generates a timing signal at the time when the first correlation signal reaches a peak, and wherein the generator selects the timing signal at the time when the first correlation signal last reaches the peak within a specified period of time specified by the period specifying signal and detects the start time point of the data frame based on the timing signal, further including a holder configured to hold the timing signal generated by the first correlation unit during a holding period of time which is shorter than the length of the synchronization symbols, the holder being further configured to output the timing signal to the generator.

10. Communication terminal apparatus comprising:

a receiver configured to receive a communication signal as a received signal that includes a preamble of repeating synchronization symbols, and a data frame following the preamble;

a first correlation unit configured to correlate between a synchronization symbol and the received signal obtained by the receiver to form a first correlation signal;

a second correlation unit configured to delay the received signal by a time corresponding to a length of the synchronization symbols to form a delay signal, and correlate between the delay signal and the received signal to form a second correlation signal;

a preamble detector configured to detect a preamble period based on the second correlation signal to output a period specifying signal;

a generator configured to detect a start time point of the data frame based on the period specifying signal and the first correlation signal, and to generate a frame synchronize signal at substantially the same time of the detection; and a demodulator configured to demodulate the received signal based on the frame synchronize signal, wherein the first correlation unit successively generates a timing signal at the time when the first correlation signal reaches a peak, and wherein the generator selects the timing signal at the time when the first correlation signal last reaches the peak within a specified period of time specified by the period specifying signal and detects the start time point of the data frame based on the timing signal, further including, an edge detector configured to detect a leading edge of the received signal and to generate an edge detection signal, wherein the first correlation unit and the second correlation unit start correlation processing when the edge detection signal is generated.

11. A frame synchronization method for establishing frame synchronization with a received signal that includes a preamble of repeating synchronization symbols, and a data frame following the preamble, the frame synchronization method comprising:

correlating between a generated synchronization symbol and the received signal to form a first correlation signal;

delaying the received signal by a time corresponding to a length of the synchronization symbols to form a delay signal, and correlating between the delay signal and the received signal to form a second correlation signal;

detecting a preamble period based on the second correlation signal to output a period specifying signal; and detecting a start time point of the data frame based on the period specifying signal and the first correlation signal, and generating a frame synchronize signal at substantially the same time of the detection, wherein the step of detecting the preamble period further comprises detecting a time interval, which is obtained during the second correlation signal, above a threshold level as the preamble period.

12. A frame synchronization method for establishing frame synchronization with a received signal that includes a preamble of repeating synchronization symbols, and a data frame following the preamble, the frame synchronization method comprising:

correlating between a generated synchronization symbol and the received signal to form a first correlation signal;

delaying the received signal by a time corresponding to a length of the synchronization symbols to form a delay signal, and correlating between the delay signal and the received signal to form a second correlation signal;

detecting a preamble period based on the second correlation signal to output a period specifying signal;

detecting a start time point of the data frame based on the period specifying signal and the first correlation signal, and generating a frame synchronize signal at substantially the same time of the detection; and detecting the leading edge of the received signal in order to generate an edge detection signal, wherein correlation processing starts when the edge detection signal is generated, and wherein the step of detecting the preamble period further comprises detecting a time interval, which is obtained during the second correlation signal, above a threshold level as the preamble period.

13. A frame synchronization method for establishing frame synchronization with a received signal that includes a preamble of repeating synchronization symbols, and a data frame following the preamble, the frame synchronization method comprising:

correlating between a generated synchronization symbol and the received signal to form a first correlation signal;

delaying the received signal by a time corresponding to a length of the synchronization symbols to form a delay signal, and correlating between the delay signal and the received signal to form a second correlation signal;

detecting a preamble period based on the second correlation signal to output a period specifying signal; and detecting a start time point of the data frame based on the period specifying signal and the first correlation signal, and generating a frame synchronize signal at substantially the same time of the detection, wherein the step of generating the first correlation signal further comprises successively generating a timing signal when the first correlation signal reaches a peak, and wherein the step of detecting the start time point of the data frame further comprises selecting the timing signal at the time when the first correlation signal last reaches the peak within a specified period of time specified by the period specifying signal and detecting the start time point of the data frame based on the timing signal.

14. A frame synchronization method for establishing frame synchronization with a received signal that includes a preamble of repeating synchronization symbols, and a data frame following the preamble, the frame synchronization method comprising:

correlating between a generated synchronization symbol and the received signal to form a first correlation signal;

delaying the received signal by a time corresponding to a length of the synchronization symbols to form a delay signal, and correlating between the delay signal and the received signal to form a second correlation signal;

detecting a preamble period based on the second correlation signal to output a period specifying signal; and detecting a start time point of the data frame based on the period specifying signal and the first correlation signal, and generating a frame synchronize signal at substantially the same time of the detection, wherein the step of generating the first correlation signal further comprises successively generating a timing signal when the first correlation signal reaches a peak, and wherein the step of detecting the start time point of the data frame further comprises selecting the timing signal at the time when the first correlation signal last reaches the peak within a specified period of time specified by the period specifying signal and detecting the start time point of the data frame based on the timing signal, further including holding the timing signal generated by the first correlation unit during a holding period of time which is shorter than the length of the synchronization symbols, the holder being further configured to output the timing signal to the generator.

15. A frame synchronization method for establishing frame synchronization with a received signal that includes a preamble of repeating synchronization symbols, and a data frame following the preamble, the frame synchronization method comprising:

correlating between a generated synchronization symbol and the received signal to form a first correlation signal;

delaying the received signal by a time corresponding to a length of the synchronization symbols to form a delay signal, and correlating between the delay signal and the received signal to form a second correlation signal;

detecting a preamble period based on the second correlation signal to output a period specifying signal; and detecting a start time point of the data frame based on the period specifying signal and the first correlation signal, and generating a frame synchronize signal at substantially the same time of the detection, wherein the step of generating the first correlation signal further comprises successively generating a timing signal when the first correlation signal reaches a peak, and wherein the step of detecting the start time point of the data frame further comprises selecting the timing signal at the time when the first correlation signal last reaches the peak within a specified period of time specified by the period specifying signal and detecting the start time point of the data frame based on the timing signal, further including detecting the leading edge of the received signal in order to generate an edge detection signal, wherein correlation processing starts when the edge detection signal is generated.

* * * * *